United States Patent
Akasaka et al.

(10) Patent No.: US 7,933,617 B2
(45) Date of Patent: Apr. 26, 2011

(54) CONTENT REPRODUCING DEVICE, CONTENT REPRODUCING SYSTEM, AUTOMATIC CONTENT RECEIVING METHOD, AND AUTOMATIC CONTENT TRANSFERRING METHOD

(75) Inventors: Koichi Akasaka, Iwate (JP); Shinji Katsuki, Tokyo (JP)

(73) Assignee: Sony Corporation, Tokyo (JP)

(*) Notice: Subject to any disclaimer, the term of this patent is extended or adjusted under 35 U.S.C. 154(b) by 488 days.

(21) Appl. No.: 12/215,236

(22) Filed: Jun. 26, 2008

(65) Prior Publication Data
US 2009/0011709 A1 Jan. 8, 2009

(30) Foreign Application Priority Data

Jul. 4, 2007 (JP) ................................. 2007-175788

(51) Int. Cl.
- H04B 7/00 (2006.01)
- H04B 17/00 (2006.01)
- H04B 1/18 (2006.01)
- H04H 40/00 (2008.01)
- H04M 1/00 (2006.01)
- H04M 1/64 (2006.01)
- G06F 15/167 (2006.01)

(52) U.S. Cl. ............... 455/500; 455/514; 455/67.11; 455/3.06; 455/41.3; 455/550.1; 455/556.1; 709/212; 709/213; 709/215; 709/216; 379/88.28

(58) Field of Classification Search .......... 455/500, 455/514, 67.11, 41.3, 3.06, 550.1, 556.1; 709/212, 213, 215, 216; 379/88.28
See application file for complete search history.

(56) References Cited

U.S. PATENT DOCUMENTS

| | | | |
|---|---|---|---|
| 7,583,886 B2* | 9/2009 | Komi et al. | 386/248 |
| 2004/0152440 A1* | 8/2004 | Yoda et al. | 455/403 |
| 2004/0171399 A1* | 9/2004 | Uchida et al. | 455/514 |
| 2004/0233475 A1* | 11/2004 | Mikuni et al. | 358/1.15 |
| 2005/0030389 A1* | 2/2005 | Katsuki | 348/222.1 |
| 2005/0146621 A1* | 7/2005 | Tanaka et al. | 348/211.2 |
| 2006/0014537 A1* | 1/2006 | Arai et al. | 455/435.1 |
| 2006/0126451 A1* | 6/2006 | Shinkai et al. | 369/30.3 |
| 2006/0259571 A1* | 11/2006 | Talluri et al. | 709/213 |
| 2007/0078899 A1* | 4/2007 | Gulin et al. | 707/200 |
| 2008/0084823 A1* | 4/2008 | Akasaka et al. | 370/235 |
| 2009/0144388 A1* | 6/2009 | Gross et al. | 709/213 |
| 2010/0031804 A1* | 2/2010 | Chevreau et al. | 84/609 |
| 2010/0146039 A1* | 6/2010 | Lo et al. | 709/203 |

FOREIGN PATENT DOCUMENTS

| | | |
|---|---|---|
| JP | 2006-012225 A | 1/2006 |
| JP | 2006-013594 A | 1/2006 |
| JP | 2006-185268 A | 7/2006 |
| JP | 2006-287394 A | 10/2006 |
| JP | 2007-104110 A | 4/2007 |
| WO | WO 2007/039589 A1 | 4/2007 |

* cited by examiner

Primary Examiner — Matthew D. Anderson
Assistant Examiner — Bobbak Safaipour
(74) Attorney, Agent, or Firm — Wolf, Greenfield & Sacks, P.C.

(57) ABSTRACT

Disclosed herein is a portable type content reproducing device for reproducing content data, said portable type content reproducing device including, a radio communication unit, a nonvolatile storage unit, a reproduction processing unit, a connection controlling unit, and a reception controlling unit.

30 Claims, 14 Drawing Sheets

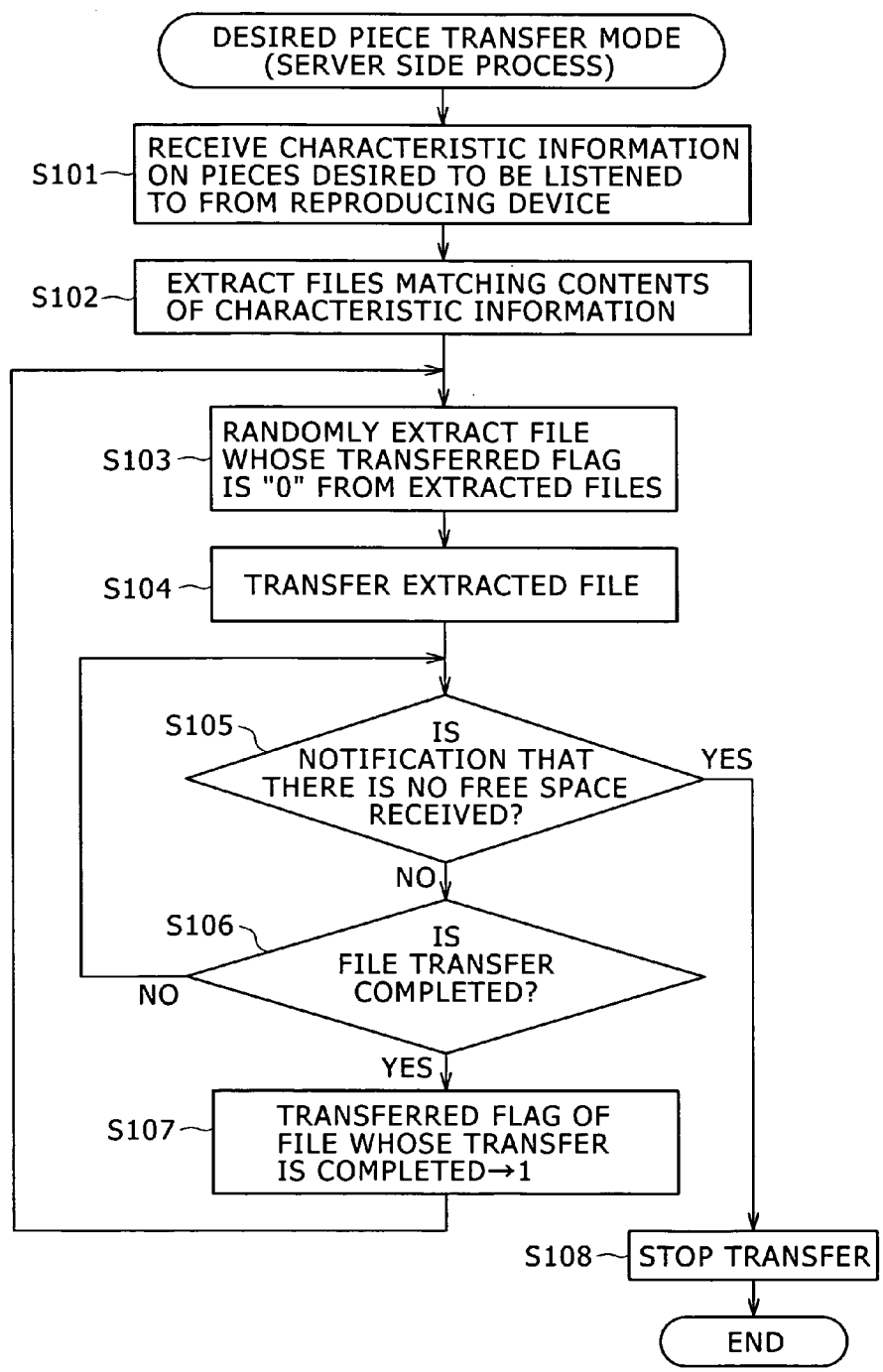

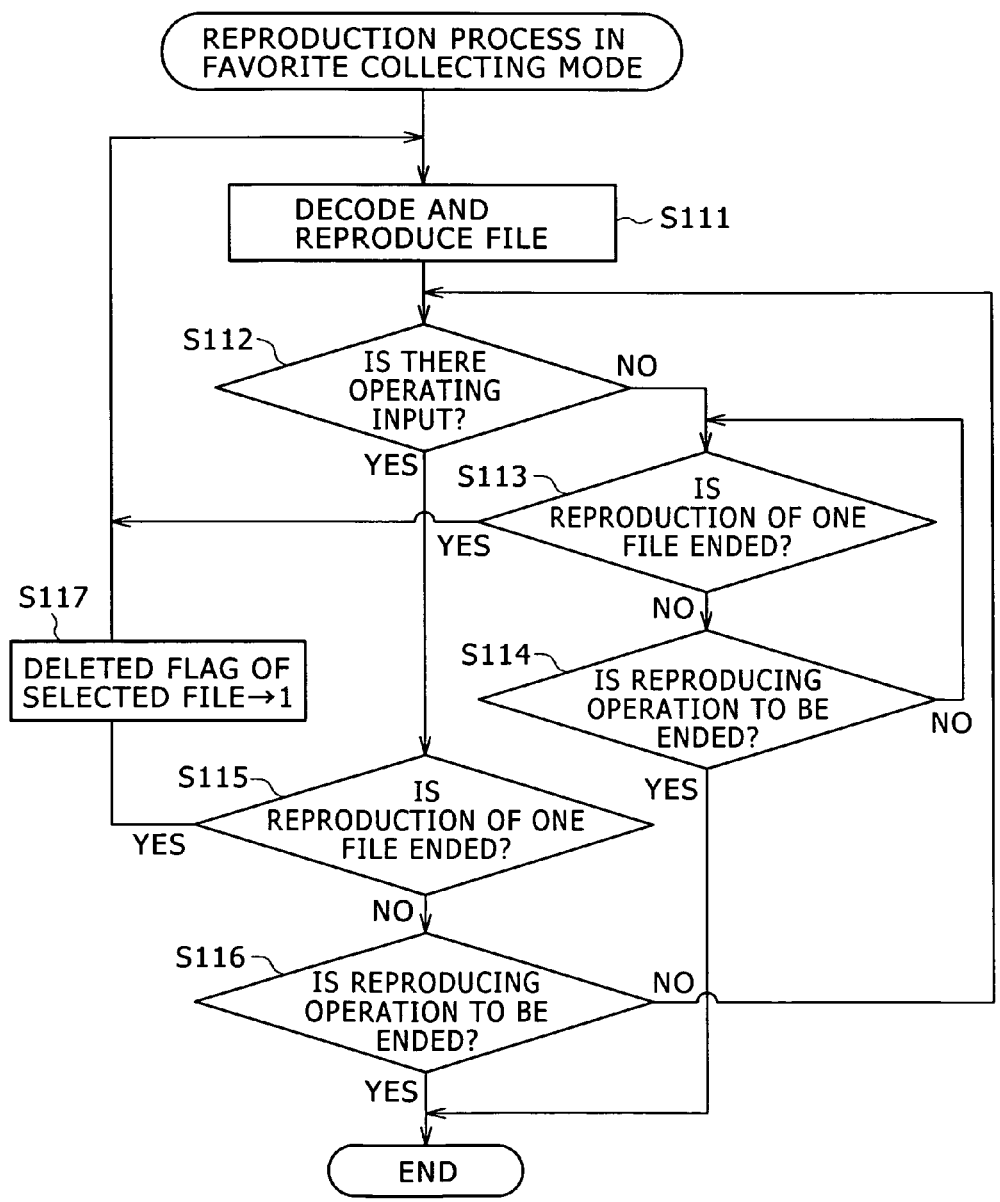

CONTENT REPRODUCING DEVICE, CONTENT REPRODUCING SYSTEM, AUTOMATIC CONTENT RECEIVING METHOD, AND AUTOMATIC CONTENT TRANSFERRING METHOD

CROSS REFERENCES TO RELATED APPLICATIONS

The present invention contains subject matter related to Japanese Patent Application JP 2007-175788 filed in the Japan Patent Office on Jul. 4, 2007, the entire contents of which being incorporated herein by reference.

BACKGROUND OF THE INVENTION

1. Field of the Invention

The present invention relates to a content reproducing device that stores and reproduces content data transmitted from a content server, a content reproducing system including the device, an automatic content receiving method using the device, and an automatic content transferring method.

2. Description of the Related Art

Recently, portable type audio players including a recording medium such as a flash memory, an HDD (Hard Disk Drive) or the like have been spreading rapidly. Many of these portable type audio players can communicate with a server such as a personal computer (PC) or the like via a USB (Universal Serial Bus) cable or the like. Thus, musical piece data stored in the server and musical piece data captured from a CD (Compact Disc) can be transferred to the recording medium within the audio player.

As an audio device that can capture pieces of musical piece data onto an internal recording medium and reproduce these pieces of musical piece data as in the audio player, there is for example an audio device that reproduces musical piece data recorded in the audio device and which thereafter deletes musical piece data for which a predetermined operation such as a skip operation or the like is performed during the reproduction from the internal recording medium (see Japanese Patent Laid-Open No. 2005-44419 (paragraph numbers [0045] to [0049], FIG. 6), for example) (hereinafter referred to as Patent Document 1). In addition, there is an audio device that presents a musical piece whose reproduction has been skipped a number of times which number is larger than a predetermined reference or a musical piece or an album that has been reproduced a smallest number of times to a user as a deletion candidate when a recording medium has no sufficient space for storing new musical piece data (Japanese Patent Laid-Open No. 2006-196048 (paragraph numbers [0025] to [0032], FIG. 4) for example) (hereinafter referred to as Patent Document 2).

SUMMARY OF THE INVENTION

In order to receive musical piece data transferred from a server, a portable type audio player as described above needs to be connected to the server via a cable. For example, when musical piece data is added to musical piece data stored on the server side, a need for connection to the server arises in order to capture the added musical piece data into the audio player. In addition, the audio player having a low storage capacity as compared with the server side, in particular, may have a high frequency of connection to the server to replace musical piece data within the audio player. Thus, there has been a desire to simply a procedure for transferring musical pieces from the server to the audio player.

There is also a desire that the audio player having a low storage capacity as compared with the server side automatically replace musical piece data within the audio player when musical piece data within the server is transferred to the audio player. According to the techniques of the above-mentioned Patent Documents 1 and 2, of musical piece data reproduced in the audio player, musical piece data considered to be preferred by a user is retained within the audio player without being deleted, whereas musical piece data considered not to be preferred by the user is automatically replaced with musical piece data transferred from the server.

However, there is another desire to make the audio player reproduce as many pieces of musical piece data stored on the server side as possible. For example, a reproducing method referred to as "shuffle reproduction" in which musical piece data within the audio player is reproduced randomly has a major feature of allowing the user to listen to a larger number of pieces of musical piece data irrespective of preferences of the user. It is thus convenient to be able to transfer a larger number of pieces of musical piece data also to the audio player having a limited storage capacity.

When the techniques of the above-mentioned Patent Documents 1 and 2 are used, most of musical piece data that has been reproduced at least once or more than once is retained in the audio player without being deleted, and musical piece data that has never been reproduced is replaced with musical piece data from the server. Therefore the number of musical pieces reproduced within the audio player increases gradually, and it takes a very long time to reproduce all the musical piece data within the server. That is, the techniques do not achieve a purpose of reproducing as many pieces of musical piece data as possible.

The present invention has been made in view of the above. It is desirable to provide a content reproducing device that can easily receive content data transferred from a server while consuming low power, and an automatic content receiving method.

It is also desirable to provide a content reproducing device that can reproduce as many pieces of musical piece data within a server as possible, a content reproducing system, an automatic content receiving method, and an automatic content transferring method.

According to an embodiment of the present invention, there is provided a portable type content reproducing device for reproducing content data, the portable type content reproducing device including:

a radio communication unit configured to connect to a network by radio and performing communication;

a nonvolatile storage unit configured to store content data received from a specific content server on a network through the radio communication unit;

a reproduction processing unit configured to reproduce content data read from the nonvolatile storage unit;

a connection controlling unit configured to count time, and making the radio communication unit perform an operation of connecting to a network by radio when a timer set time has passed; and a reception controlling unit configured to control an operation of receiving content data through the radio communication unit;

wherein when the specific content server is present on a network to which the content reproducing device is connected by radio by the radio communication unit, the reception controlling unit receives content data from the specific content server through the radio communication unit and stores the content data in free space of the nonvolatile storage unit, and then sets the timer set time to a predetermined time and makes the connection controlling unit start counting time, and when a radio signal for connecting to a network is detected by the radio communication unit, but the specific content server is not present on the connected network, the reception controlling unit extends the timer set time and makes the connection controlling unit start counting time.

According to another embodiment of the present invention, there is provided a portable type content reproducing device for reproducing content data, the portable type content reproducing device including:

a communication unit configured to communicate with a content server;

a nonvolatile storage unit configured to store content data received from the content server through the communication unit;

a reproduction processing unit configured to reproduce content data read from the nonvolatile storage unit;

a reproduction identification processing unit configured to, when the content data is reproduced by the reproduction processing unit, update reproduction identifying information corresponding to the reproduced content data such that the reproduction identifying information indicates that the content data has been reproduced; and a reception controlling unit configured to delete the content data whose corresponding the reproduction identifying information indicates that the content data has been reproduced from the nonvolatile storage unit after detecting that the content reproducing device is connected to the content server through the communication unit, then receiving new content data from the content server through the communication unit, and storing the new content data in free space of the nonvolatile storage unit.

According to still another embodiment of the present invention, there is provided a content reproducing system for allowing content data transmitted from a content server to be recorded and reproduced in a portable type content reproducing device, wherein the portable type content reproducing device including a first communication unit configured to communicate with the content server, a first nonvolatile storage unit configured to store content data received from the content server through the first communication unit, a reproduction processing unit configured to reproduce content data read from the first nonvolatile storage unit, a reproduction identification processing unit configured to, when the content data is reproduced by the reproduction processing unit, update reproduction identifying information corresponding to the reproduced content data such that the reproduction identifying information indicates that the content data has been reproduced, and a reception controlling unit configured to delete the content data whose corresponding the reproduction identifying information indicates that the content data has been reproduced from the first nonvolatile storage unit after detecting that the content reproducing device is connected to the content server through the first communication unit, then receiving new content data from the content server through the first communication unit, and storing the new content data in free space of the first nonvolatile storage unit, and the content server includes a second communication unit configured to communicate with the content reproducing device, a second nonvolatile storage unit configured to store content data, a content managing unit configured to manage as to whether each piece of content data stored in the second nonvolatile storage unit has been transmitted to the content reproducing device, and a transmission controlling unit configured to, referring to the content managing unit, extract untransmitted content data from the content data stored in the second nonvolatile storage unit, and transmitting the untransmitted content data to the content reproducing device after detecting that the content server is connected to the content reproducing device through the second communication unit.

According to yet another embodiment of the present invention, there is provided an automatic content receiving method of a portable type content reproducing device, the portable type content reproducing device storing and reproducing content data received from a content server by radio communication, the automatic content receiving method including:

a connecting step of a connection controlling unit counting time and making a radio communication unit perform an operation of connecting to a network by radio when a timer set time has passed; and a reception controlling step of a reception controlling unit controlling a receiving operation of receiving content data from a specific content server on the network through the radio communication unit and storing the content data in a nonvolatile storage unit;

wherein in the reception controlling step, when the specific content server is present on a network to which the content reproducing device is connected by radio by the radio communication unit in the connecting step, content data is received from the specific content server through the radio communication unit and stored in free space of the nonvolatile storage unit, and then the timer set time is set to a predetermined time and the connecting step is started again, and when a radio signal for connecting to a network is detected by the radio communication unit in the connecting step, but the specific content server is not present on the connected network, the timer set time is extended and the connecting step is started again.

According to yet another embodiment of the present invention, there is provided an automatic content receiving method of a portable type content reproducing device, the portable type content reproducing device storing and reproducing content data received from a content server, the automatic content receiving method including:

a step of, when content data read from a nonvolatile storage unit is reproduced, a reproduction identification processing unit updating reproduction identifying information corresponding to the reproduced content data such that the reproduction identifying information indicates that the content data has been reproduced; and a step of, after detecting that the content reproducing device is connected to the content server through a communication interface, a reception controlling unit deleting the content data whose corresponding the reproduction identifying information indicates that the content data has been reproduced from the nonvolatile storage unit, then receiving new content data from the content server through the communication interface, and storing the new content data in free space of the nonvolatile storage unit.

According to yet another embodiment of the present invention, there is provided an automatic content transferring method of a content reproducing system, the content reproducing system allowing content data transmitted from a content server to be recorded and reproduced in a portable type content reproducing device, the automatic content transferring method including:

a step of, when the content reproducing device reproduces content data stored in a first nonvolatile storage unit of the content reproducing device, the content reproducing device updating reproduction identifying information corresponding to the reproduced content data such that the reproduction identifying information indicates that the content data has been reproduced;

a step of the content server managing by transmission managing information as to whether each piece of content data stored in a second nonvolatile storage unit of the content server has been transmitted to the content reproducing device;

a step of the content reproducing device deleting the content data whose corresponding the reproduction identifying information indicates that the content data has been reproduced from the first nonvolatile storage unit after detecting that the content reproducing device is connected to the content server;

a step of, referring to the transmission managing information, the content server extracting untransmitted content data from the content data stored in the second nonvolatile storage unit, and transmitting the untransmitted content data to the content reproducing device after detecting that the content server is connected to the content reproducing device; and a step of the content reproducing device storing the content data received from the content server in free space of the first nonvolatile storage unit.

In the content reproducing device according to the above-described embodiment of the present invention, an operation of connecting to a network is automatically performed according to the timer set time, and when the content reproducing device is connected to a specific content server at the time of the connecting operation, content data is automatically received from the content server. Therefore the content data can be easily transferred from the content server and then stored without a user performing any particular operation. In addition, when it is determined that the content reproducing device is connected to a network different from a desired network at the time of performing the connecting operation, a time before the making of a next automatic connection is extended. It is thus possible to reduce unnecessary operations of connecting to a network, and thereby reduce power consumption.

In addition, in the content reproducing device according to the above-described embodiment of the present invention, when content data in the nonvolatile storage unit is replaced by data from the content server, reproduced content data is automatically deleted, and new content data is stored in free space. It is therefore often that new unreproduced content data is stored. Thus, the content reproducing device can reproduce as many pieces of content data as possible among the pieces of content data that can be transferred by the content server.

Further, in the content reproducing system according to the above-described embodiment of the present invention, when content data stored in the content reproducing device is replaced by data from the content server, reproduced content data is automatically deleted, and new content data is stored in free space. At this time, only untransferred content data is transferred from the content server to the content reproducing device. Therefore unreproduced content data is newly stored in the content reproducing device at all times. Thus, the content reproducing device can reproduce as many pieces of content data as possible among the pieces of content data that can be transferred by the content server.

BRIEF DESCRIPTION OF THE DRAWINGS

FIG. 13 is a flowchart representing a process procedure on the audio server side in an audio file automatic updating process in a desired piece transfer mode; and FIG. 14 is a flowchart representing a process procedure for reproducing an audio file in a favorite collecting mode.

DETAILED DESCRIPTION OF THE PREFERRED EMBODIMENTS

Preferred embodiments of the present invention will hereinafter be described in detail with reference to the drawings. In the following description, audio data is applied as an example of content data reproduced in a reproducing device.

Figure 1:
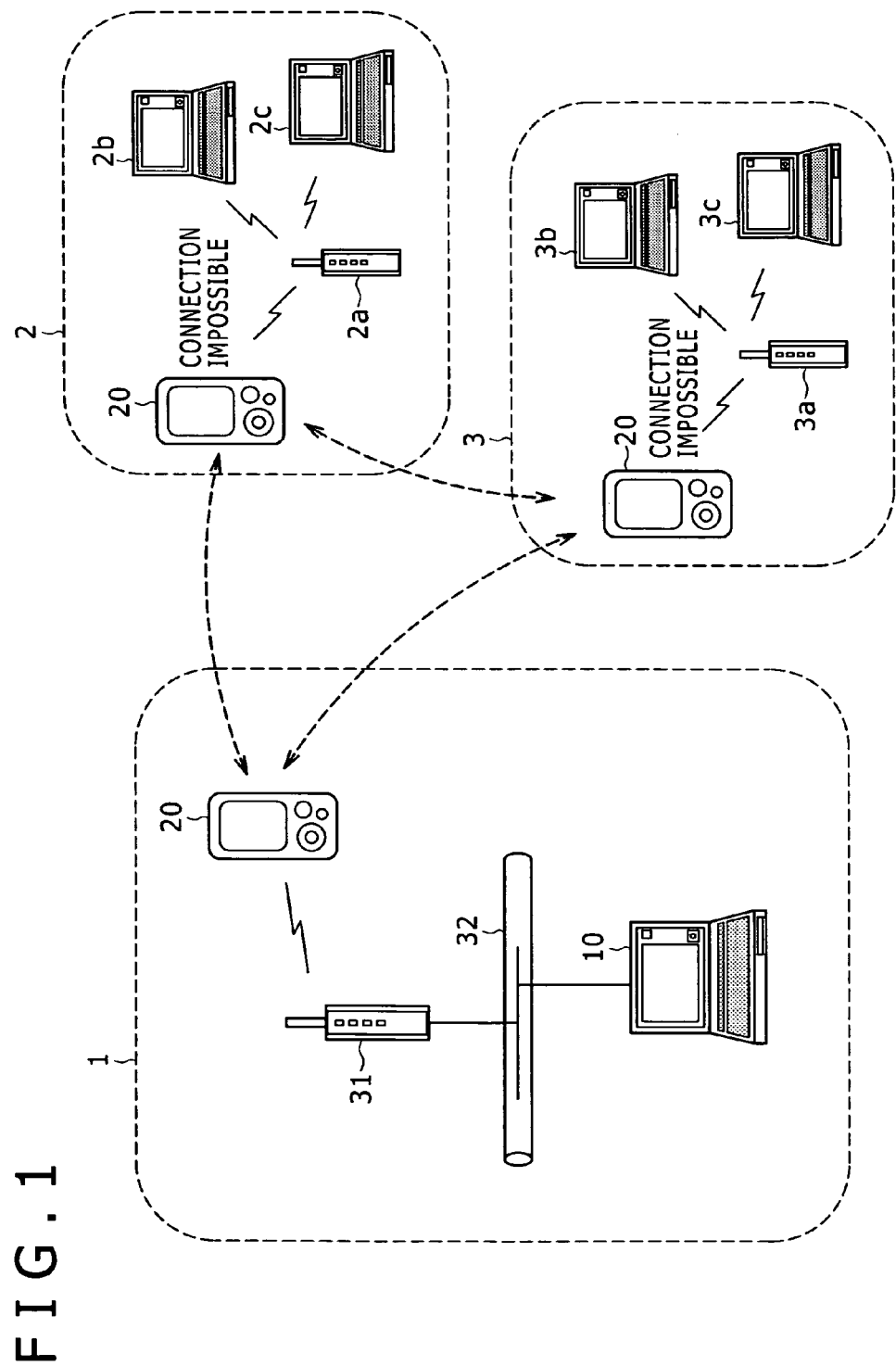
FIG. 1 is a diagram showing an example of configuration of a home network system according to an embodiment.

FIG. 1 is a diagram showing an example of configuration of a home network system according to an embodiment.

The home network system 1 shown in FIG. 1 has a configuration in which an audio server 10 formed by a PC or the like and a portable type audio reproducing device 20 are connected to each other by a LAN (Local Area Network). Of these devices, the audio reproducing device 20 has a function of connection by a wireless LAN. The audio reproducing device 20 is connected by radio to the LAN via an access point 31. The audio server 10 is connected to the LAN via a LAN cable 32. Incidentally, the audio server 10 may also be connected by a wireless LAN.

The audio server 10 stores a large number of audio files reproducible by the audio reproducing device 20 on an internal high-capacity recording medium. The audio server 10 has a function of transferring these audio files to the audio reproducing device 20 connected to the audio server 10 via the LAN. The audio reproducing device 20 can store transferred audio files on an internal recording medium, and reproduce these audio files off-line.

In general, the portable type audio reproducing device 20 has a limited storage capacity. Suppose that also in the present embodiment, the number of audio files that can be stored in the audio reproducing device 20 is small as compared with the audio server 10. Accordingly, as will be described later, it is made possible between the audio reproducing device 20 and the audio server 10 to automatically update audio files within the audio reproducing device 20 using the large number of audio files within the audio server 10. Further, such an audio file updating process is performed automatically between the audio reproducing device 20 and the audio server 10 when the audio reproducing device 20 joins the home network 1 and is connected to the audio server 10.

The audio reproducing device 20 has a function of being automatically connected to a wireless LAN to implement such an audio file automatic updating process. Therefore a wireless LAN interface of the audio reproducing device 20 needs to be able to detect an RF (Radio Frequency) signal of a wireless LAN at all times or at predetermined intervals. In this case, the audio reproducing device 20 may detect an RF signal of an external wireless network when taken out of home by the user.

FIG. 1 shows public wireless networks 2 and 3 provided in a store, public facilities or the like as examples of the external wireless network. The public wireless network 2 has an access point 2a of the wireless LAN. Devices such as PCs 2b and 2c or the like can be connected to the LAN via the access point 2a. The public wireless network 3 similarly has an access point 3a of the wireless LAN. Devices such as PCs 3b and 3c or the like can be connected to the LAN via the access point 3a.

On the other hand, the audio reproducing device 20 can be connected to only a specific server (the audio server 10 in this case) as an audio file transfer source. The audio reproducing device 20 is connected to only the predetermined server using for example an SSID (Service Set ID) identifying a wireless network as a connection destination and a MAC (Media Access Control) address of a connection destination device. Thus, for example, even when the audio reproducing device 20 moves to the inside of an area where the audio reproducing device 20 can communicate with the access point 2a or 3a, and the audio reproducing device 20 detects an RF signal from the access point 2a or 3a, the audio reproducing device 20 does not connect to the access point 2a or 3a or the devices such as the PCs or the like connected by radio to these access points on the basis of the above-described information.

As will be described later, using such a connection destination identifying function, the present embodiment implements power reducing control that reduces power consumed at the wireless LAN interface in the audio reproducing device 20.

Incidentally, the wireless LAN function of the audio reproducing device 20 in the present embodiment for example establishes radio connection in an infrastructure mode. However, the audio reproducing device 20 may establish radio connection in an ad hoc mode and thus directly connect to the audio server 10 without the intervention of the access point 31.

Figure 2:
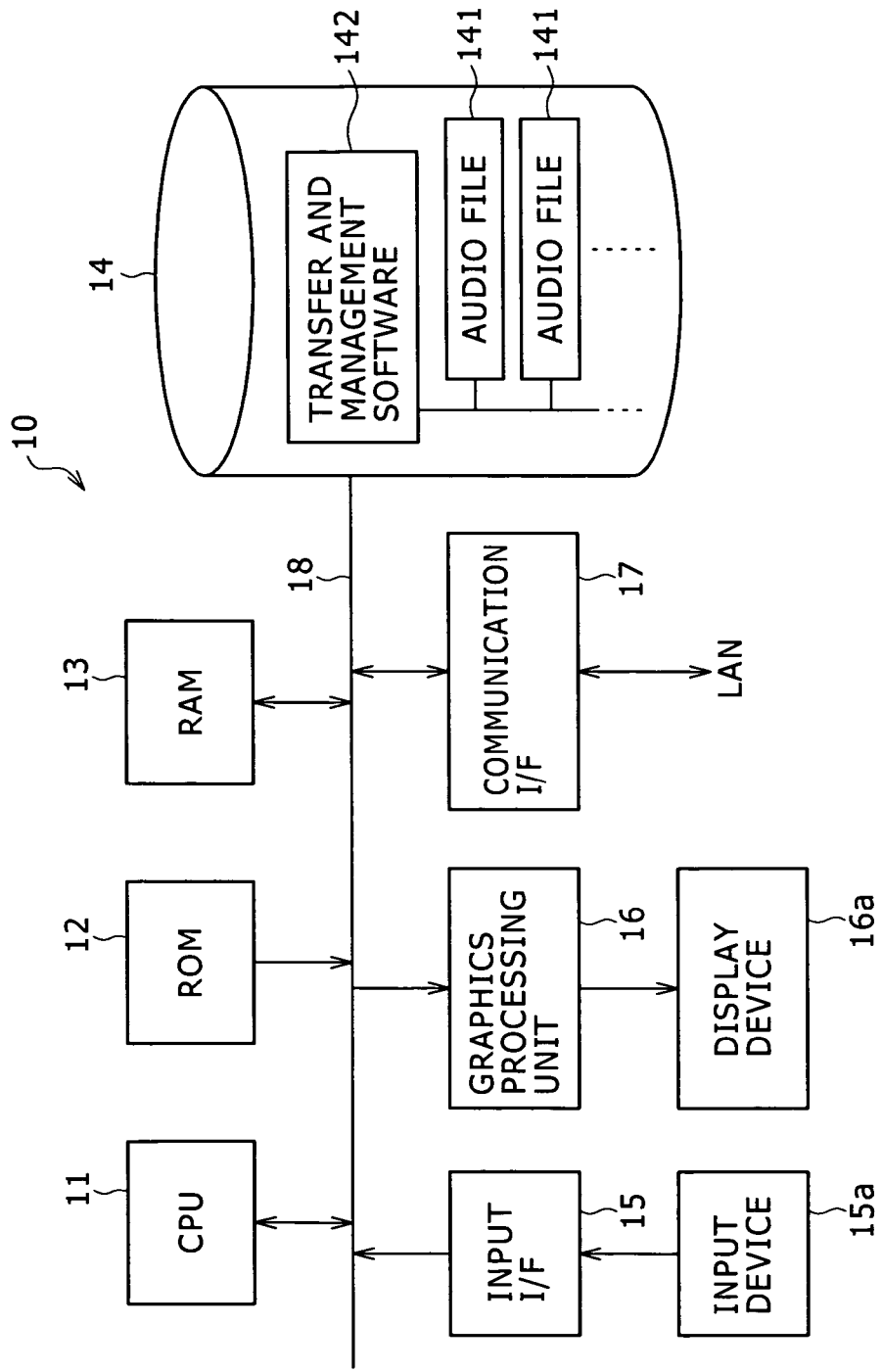
FIG. 2 is a block diagram showing a hardware configuration of an audio server.

FIG. 2 is a block diagram showing a hardware configuration of the audio server.

As shown in FIG. 2, the audio server 10 includes a CPU (Central Processing Unit) 11, a ROM (Read Only Memory) 12, a RAM (Random Access Memory) 13, an HDD 14, an input interface (I/F) 15, a graphics processing unit 16, and a communication interface (I/F) 17. These parts are interconnected via an internal bus 18.

The CPU 11 controls the whole of the audio server 10. The ROM 12 stores a program executed in the CPU 11, data necessary in processes, and the like. The RAM 13 is mainly used as a work area in various processes.

The HDD 14 has a capacity to store a large number of audio files 141 and the like. In addition, the HDD 14 retains various programs to be executed by the CPU 11, data necessary in the processes, and the like, and is also used as a work area at times of these processes.

In the present embodiment, the HDD 14 stores transfer and management software 142 for managing the audio files 141 stored on the HDD 14 and transferring these audio files 141 to the audio reproducing device 20. The transfer and management software 142 is executed by the CPU 11.

The input I/F 15 is connected with an input device 15a such as a keyboard and a mouse, for example. The input I/F 15 transmits a signal from the input device 15a to the CPU 11 via the internal bus 18.

The graphics processing unit 16 is connected with a display device 16a such as an LCD (Liquid Crystal Display), for example. The graphics processing unit 16 displays an image on the screen of the display device 16a according to an instruction from the CPU 11.

The communication I/F 17 connects to the LAN via the LAN cable 32 not shown in the figure to transmit and receive data to and from other devices. Incidentally, the communication I/F 17 may support so-called Wake On LAN (hereinafter referred to as WOL). In this case, the communication I/F 17 monitors a WOL signal sent out on the LAN when the audio server 10 is in a sleep state. When receiving a WOL signal directed to the audio server 10 from the audio reproducing device 20, for example, the communication I/F 17 supplies the power controller of a motherboard (not shown) with an instruction to turn on power, so that the audio server 10 can be started.

Figure 3:
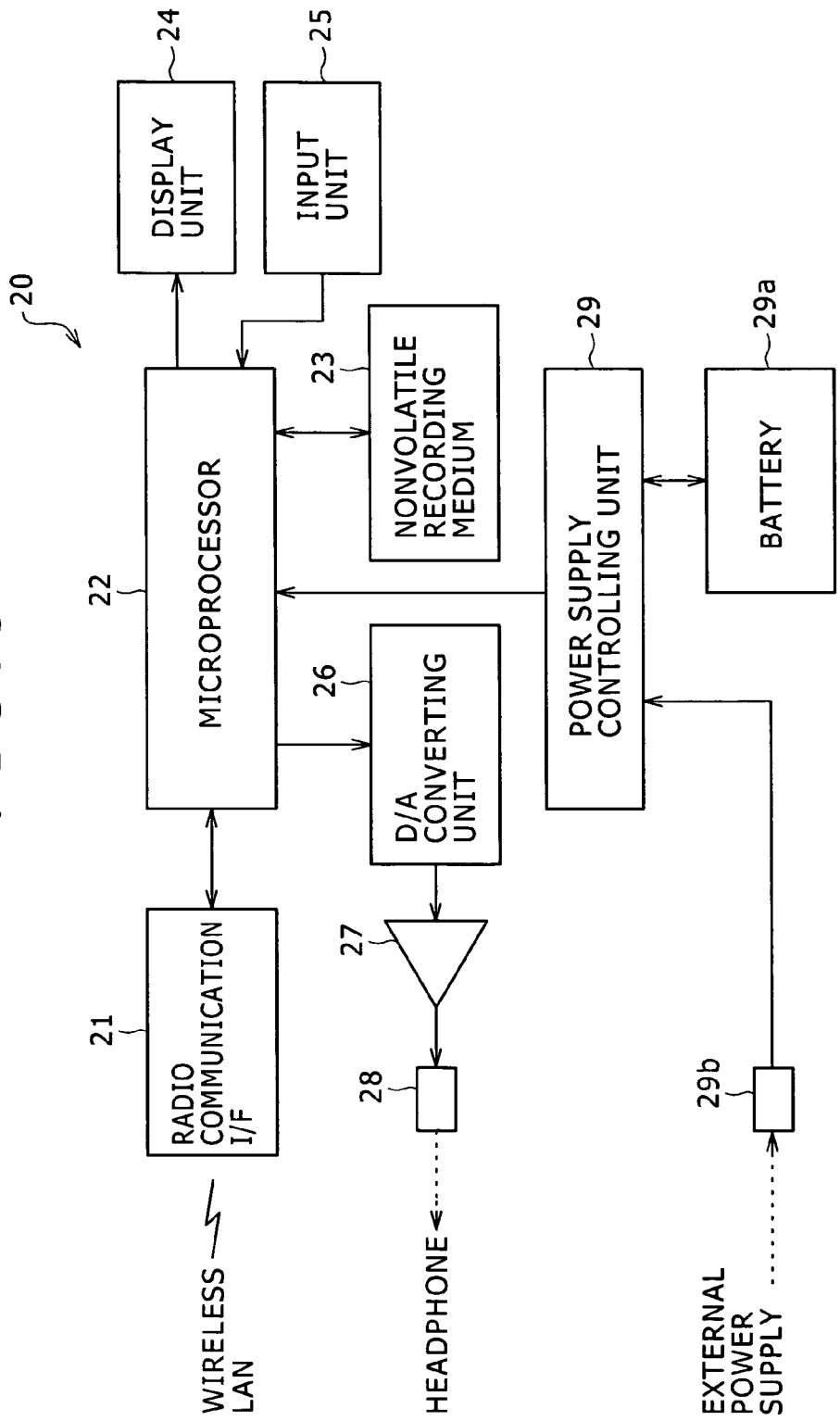
FIG. 3 is a block diagram showing a hardware configuration of an audio reproducing device.

FIG. 3 is a block diagram showing a hardware configuration of the audio reproducing device.

As shown in FIG. 3, the audio reproducing device 20 includes a radio communication I/F 21, a microprocessor 22, a nonvolatile recording medium 23, a display unit 24, an input unit 25, a D/A (Digital/Analog) converter 26, an audio amplifier 27, an output terminal 28, and a power supply controlling unit 29. The power supply controlling unit 29 is connected with a battery 29a and an external power supply terminal 29b.

The radio communication I/F 21 is an I/F circuit for connecting to a wireless LAN, and transmitting and receiving data.

The microprocessor 22 controls the whole of the audio reproducing device 20. This microprocessor 22 has for example a control function performed when an audio file transferred from the audio server 10 is received through the radio communication I/F 21, a reproduction processing function of reproducing an audio file recorded on the nonvolatile recording medium 23 (including a function of expanding and decoding compressed data), a user I/F processing function (for example a display processing function for displaying the title of a musical piece, reproduction operation, and the like, and an input receiving function for selection of a musical piece, selection of an operation mode, and the like), and a control function for reducing power consumption at the radio communication I/F 21.

The nonvolatile recording medium 23 stores audio files transferred from the audio server 10 via the wireless LAN.

For example, a flash memory, a small HDD or the like is applied as the nonvolatile recording medium 23.

The display unit 24 is for example formed by an LCD (Liquid Crystal Display) or the like. The display unit 24 displays information such as a list of the titles of musical pieces or the like according to output information from the microprocessor 22.

The input unit 25 includes various input keys and the like. The input unit 25 receives an input operation from a user, and then sends a control signal corresponding to the operation to the microprocessor 22.

The D/A converter 26 converts audio data decoded by the reproduction processing function of the microprocessor 22 into an analog audio signal. The audio signal after the conversion is amplified by the audio amplifier 27, and then output to a headphone connected to this device, for example, via the output terminal 28.

The battery 29a is for example formed by a lithium-ion type secondary battery (battery cell). This battery 29a may be fixedly mounted in the audio reproducing device 20, or may be detachable.

The external power supply terminal 29b is a terminal for being supplied with power from an external power supply such as a commercial AC power supply or the like. The external power supply terminal 29b in the present embodiment serves both as a terminal for receiving power for driving the audio reproducing device 20 and a terminal for receiving power for charging the battery 29a. Incidentally, these terminals may be provided separately from each other.

The power supply controlling unit 29 includes for example a circuit for driving the audio reproducing device 20 by the power supplied from the battery 29a or the external power supply terminal 29b and a circuit for controlling an operation of charging the battery 29a by the power from the external power supply terminal 29b. In addition, the power supply controlling unit 29 in the present embodiment has a function of notifying the microprocessor 22 of information indicating on which of the power from the battery 29a and the power from the external power supply the audio reproducing device 20 is operating, information indicating whether the charging operation is performed, information indicating an amount of charge remaining in the battery 29a, and the like.

[Automatic Connection Process of Audio Reproducing Device]

Figure 4:
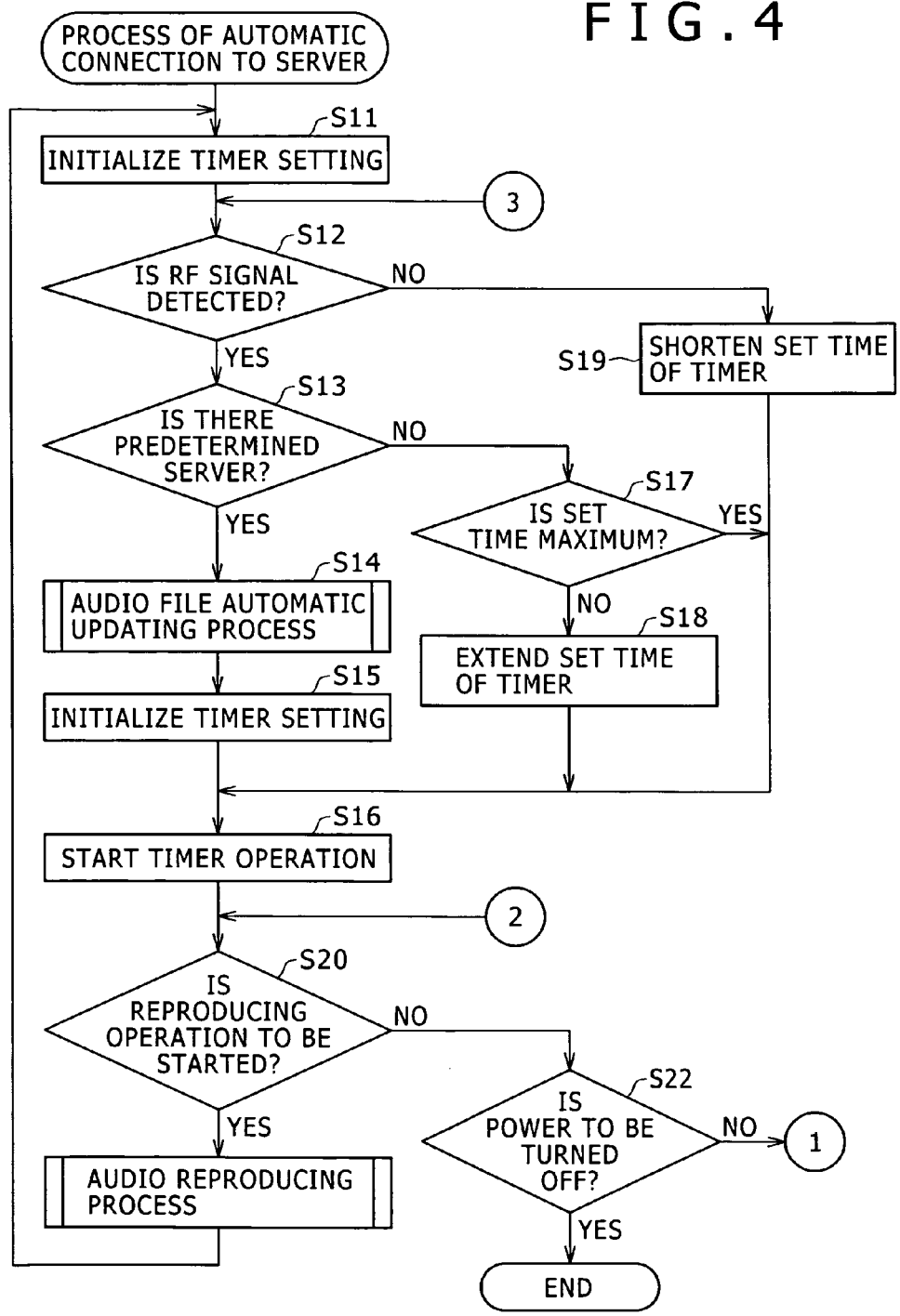
FIG. 4 is a flowchart (1) of the procedure of a process of automatic connection of the audio reproducing device with the audio server.
Figure 5:
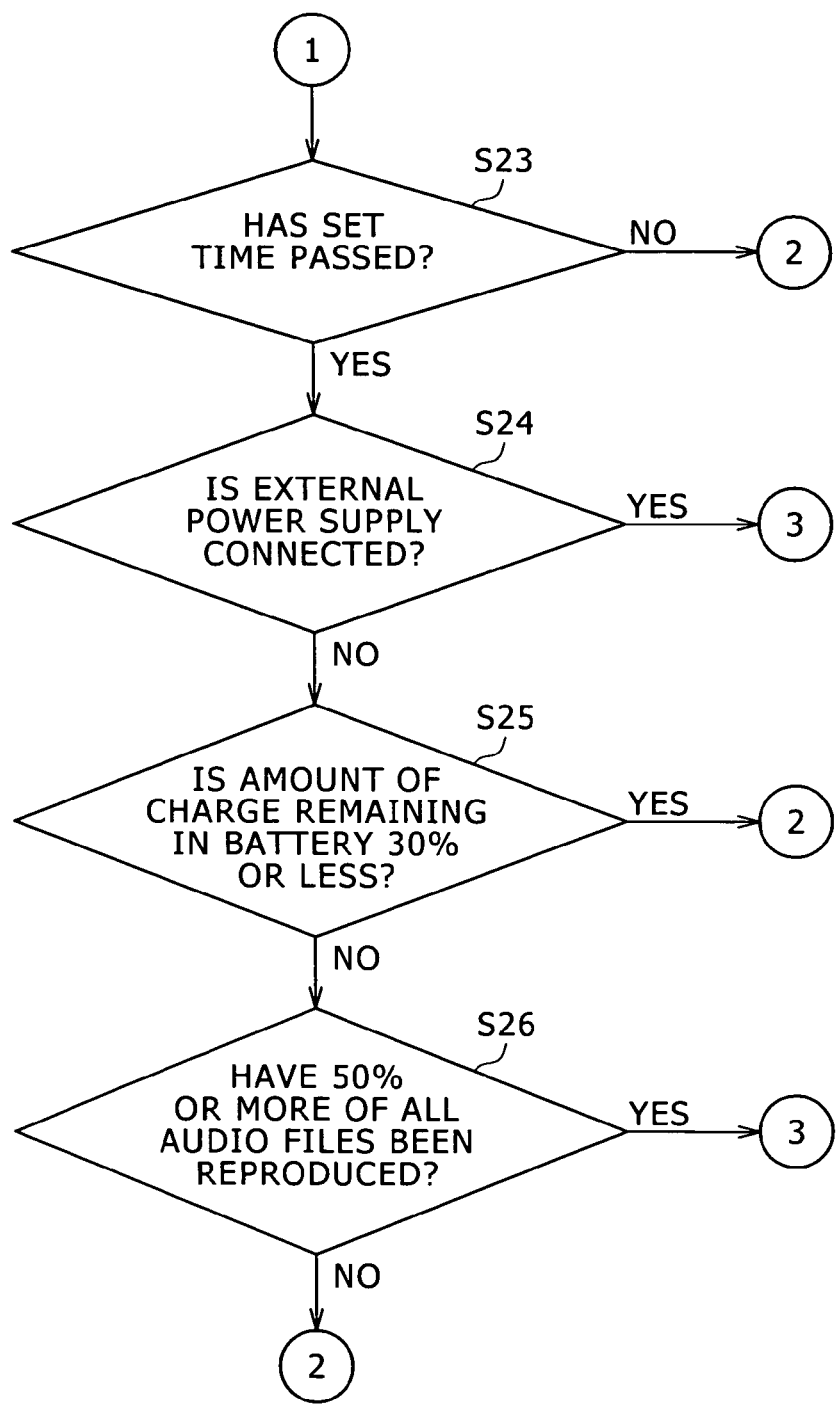
FIG. 5 is a flowchart (2) of the procedure of the process of automatic connection of the audio reproducing device with the audio server.

Description will next be made of a function of automatic connection of the audio reproducing device 20 to the audio server 10. FIG. 4 and FIG. 5 are flowcharts of the procedure of a process of automatic connection of the audio reproducing device with the audio server.

The microprocessor 22 of the audio reproducing device 20 has a timer function for determining an interval at which an RF signal of a wireless LAN is detected. First, when the audio reproducing device 20 is started, the microprocessor 22 initializes a set time of the timer to a predetermined minimum time (for example five minutes) (step S11). Then, the microprocessor 22 determines whether an RF signal is detected by the radio communication I/F 21 (step S12).

When an RF signal is detected, the microprocessor 22 determines whether the predetermined audio server 10 is present at a destination of connection by the radio communication I/F 21 (step S13). Specifically, for example, the microprocessor 22 receives an SSID through the radio communication I/F 21 from an access point at the connection destination, and compares the SSID with an SSID set in advance and stored in the audio reproducing device 20. When these SSIDs coincide with each other, the microprocessor 22 makes the radio communication I/F 21 connect to the network and collect MAC addresses of devices connected to the network. The microprocessor 22 then determines whether the collected MAC addresses includes the MAC address of the audio server 10 which MAC address is stored in advance. Incidentally, before searching the devices connected on the network, whether the MAC address of the connected access point coincides with a MAC address stored in advance may be determined.

When the audio server 10 is present on the connected network, the microprocessor 22 performs a process of automatically updating audio files with the audio server 10 (step S14). Incidentally, this automatic updating process will be described later in detail. When the automatic updating process is ended, the microprocessor 22 initializes the set time of the timer to a minimum time (for example five minutes) (step S15), and then starts the counting operation of the timer (step S16).

When the microprocessor 22 determines in step S13 that the predetermined audio server 10 is not present at the connection destination, the microprocessor 22 determines whether the present set time of the timer is a predetermined maximum time (for example 30 minutes) (step S17). When the present set time of the timer is not the maximum time, the microprocessor 22 extends the set time of the timer to the maximum time (step S18). Then the microprocessor 22 starts the counting operation of the timer using the set time (step S16). When the microprocessor 22 determines in step S17 that the present set time of the timer is the maximum time, on the other hand, the microprocessor 22 starts the counting operation of the timer using the set time (step S16).

When the microprocessor 22 determines in step S12 that no RF signal is detected by the radio communication I/F 21, the microprocessor 22 shortens the set time of the timer by a predetermined time (step S19). In this case, for example, the set time is shortened only when the present set time of the timer is not a minimum time (for example five minutes). As an example, when the present set time is a maximum of 30 minutes, the present set time is shortened to 15 minutes. When the present set time is 15 minutes, the present set time is shortened to 10 minutes. When the present set time is 10 minutes, the present set time is shortened to a minimum of 5 minutes. Then the microprocessor 22 starts the counting operation of the timer using the set time (step S16).

After starting the counting operation of the timer, the microprocessor 22 determines whether a start of an operation of reproducing an audio file stored on the nonvolatile recording medium 23 is requested by a user operation (step S20). When a start of the reproducing operation is requested, the microprocessor 22 performs a process of decoding the audio file and producing reproduction output (step S21). Incidentally, the counting operation of the timer is stopped while the audio file reproducing process is performed. Thereafter, when the reproducing process is ended, the microprocessor 22 initializes the set time of the timer to the minimum time (step S11), and monitors an RF signal of a wireless LAN again.

When the microprocessor 22 determines that a start of the reproducing operation is not requested, the microprocessor 22 determines whether a request to turn off the power is made by a user operation (step S22). When a request to turn off the power is made, an ending operation for turning off the power is performed (not shown).

When a request to turn off the power is not made, on the other hand, the microprocessor 22 determines whether the present set time has passed on the basis of the counting operation of the timer (step S23). When the set time has not passed, the microprocessor 22 determines again whether a start of the process of reproducing an audio file is requested (step S20).

When the set time has passed, the microprocessor 22 determines on the basis of information from the power supply controlling unit 29 whether an external power supply is connected (step S24). When an external power supply is connected (to be more specific, when the audio reproducing device 20 is operating on power from the external power supply), the microprocessor 22 determines again whether an RF signal of a wireless LAN is received (step S12). Incidentally, in step S24, a transition may be made to the process of step S12 also when the battery 29a is being charged by the power from the external power supply.

When the microprocessor 22 determines in step S24 that no external power supply is connected, the microprocessor 22 determines on the basis of information from the power supply controlling unit 29 whether an amount of charge remaining in the battery 29a is 30% or less (step S25). When the amount of charge remaining in the battery 29a is 30% or less, the microprocessor 22 determines again whether the process of reproducing an audio file is started (step S20).

When the amount of charge remaining in the battery 29a is not 30% or less, the microprocessor 22 determines whether the number of audio files reproduced by the audio reproducing device 20 represents 50% or more of all audio files stored on the nonvolatile recording medium 23 (step S26). Incidentally, the number of reproduced audio files can be calculated on the basis of a "reproduced flag" to be described later.

When the number of audio files reproduced by the audio reproducing device 20 represents 50% or more of all the audio files stored on the nonvolatile recording medium 23, the microprocessor 22 determines again whether an RF signal of a wireless LAN is received (step S12). When the number of audio files reproduced by the audio reproducing device 20 represents less than 50% of all the audio files stored on the nonvolatile recording medium 23, on the other hand, the microprocessor 22 determines again whether the process of reproducing an audio file is started (step S20).

Incidentally, in a case of a favorite collecting mode (see FIG. 14) to be described later, the process of step S26 is performed with the number of audio files whose deletion flag is "1" being used as a criterion of determination in place of the number of reproduced audio files.

In the above process, it suffices to perform an operation of connecting to a wireless LAN using the radio communication I/F 21 each time the set time has passed since a start of the counting operation of the timer. Therefore the operation of the radio communication I/F 21 can be stopped during other periods (during the counting operation of the timer, during the audio file automatic updating process, and during the audio file reproducing process). More specifically, under control of the microprocessor 22, the radio communication I/F 21 is operated only during the process of steps S12, S13, and S14 of the process steps of FIG. 4, and the supply of power to the radio communication I/F 21 is stopped in the other process steps. Thus, the power consumption of the audio reproducing device 20 during the periods of the stopped operation can be reduced.

In addition, the set time of the timer is changed according to whether or not there is an RF signal of a wireless LAN or whether or not the specific audio server 10 is connected. First, when an RF signal is detected, and the specific audio server 10 is not present on the connected network, it is considered that the audio reproducing device 20 is connected to an external network different from the network to which the audio reproducing device 20 is to be connected (the home network 1 in this case). This external network is often a public wireless network as in FIG. 1 or an intra-corporate network. In these cases, it is considered that it takes a relatively long time for the user to be home carrying the audio reproducing device 20. Thus, in this case, the set time of the timer is set to the maximum time (step S18), and thus a time before a next operation of connecting to a wireless LAN is lengthened, so that unnecessary power consumption can be prevented.

When no RF signal is detected, the set time of the timer is shortened gradually. In particular, when an RF signal of an external network is detected and thereafter no RF signal is detected, it is considered that the user carrying the audio reproducing device 20 has moved, and the user may come straight home. Thus, by gradually shortening the set time of the timer, the audio file automatic updating process can be performed as quickly as possible after the user gets home.

Further, in the example of FIG. 4, when an RF signal is received, and the specific audio server 10 is present on the connected network, the audio reproducing device 20 is connected to the audio server 10, performs the audio file automatic updating process (step S14), and then sets the set time of the timer to the minimum time (step S15). This is because when the audio file automatic updating process is performed in the home in particular, the battery 29a included in the audio reproducing device 20 is often charged simultaneously, and thus there is a relatively low degree of necessity for reducing power consumption of the battery 29a.

However, because it can also be considered that there are few cases of a need for performing the automatic updating process again arising within a short time after the automatic updating process is once performed, the set time of the timer may be extended to a longer time (for example the maximum time) in step S15. Alternatively, an operation of charging the battery 29a may be detected to set the set time of the timer to the minimum time when the battery 29a is being charged and set the set time of the timer to a longer time when the battery 29a is not being charged.

In the above-described process, as an example, even when the counting operation of the timer is performed and the set time has passed, in a case where the audio reproducing device 20 is being driven by the battery 29a and the amount of charge remaining in the battery 29a is equal to or smaller than a predetermined amount (step S25), the operation of connecting to a wireless LAN is not performed, whereby power consumption is further reduced. In addition, also when the number of reproduced audio files has not reached a predetermined ratio (step S26), the operation of connecting to a wireless LAN is not performed, and thus the number of times that the operation of connecting to a wireless LAN is performed is reduced, whereby power consumption is reduced.

The above-described process procedure makes it possible to perform the audio file automatic updating process as quickly as possible when the audio reproducing device 20 enters the area of the home network 1, while reducing power consumption by the operation of connecting to a wireless LAN as much as possible.

[Audio File Automatic Updating Process: All-Piece Transfer Mode]

Concrete description will next be made of the audio file automatic updating process for the audio reproducing device 20. The automatic updating process to be described below has an objective of making the audio reproducing device 20 reproduce as many audio files as possible of audio files stored in the audio server 10. Such an operation mode will be referred to as an all-piece transfer mode. By setting the audio reproducing device 20 (and the audio server 10 in some cases) in this operation mode, the following process is performed automatically.

Figure 6:
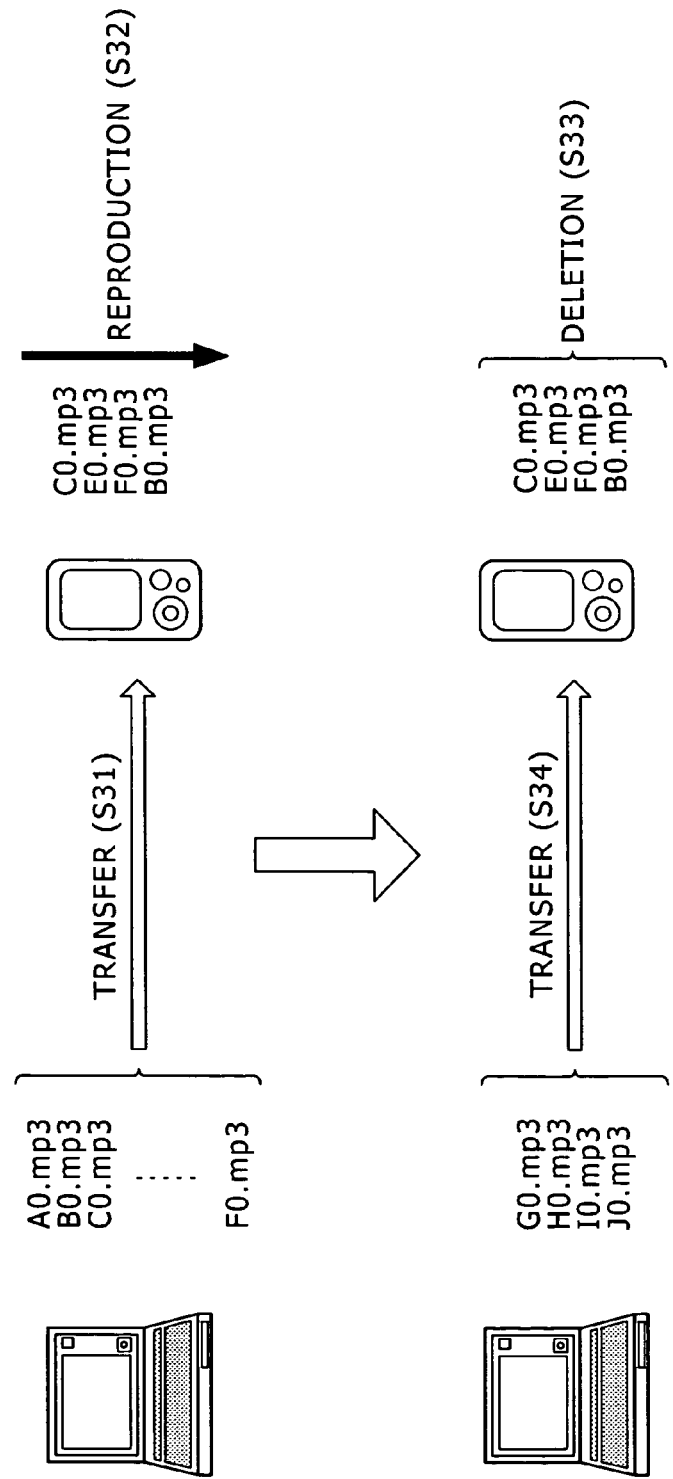
FIG. 6 is a diagram schematically showing basic transfer and reproduction operation in an all-piece transfer mode.

FIG. 6 is a diagram schematically showing basic transfer and reproduction operation in the all-piece transfer mode.

First, when the audio reproducing device 20 and the audio server 10 have been automatically connected to each other, the audio server 10 selects audio files having file names "A0.mp3", "B0.mp3", "C0.mp3", ..., and "F0.mp3" from audio files stored on the HDD 14, and then transfers the selected audio files to the audio reproducing device 20 (step S31). The audio reproducing device 20 stores the transferred audio files on the nonvolatile recording medium 23. Incidentally, in this case, suppose that the transferred audio files leave no free audio file storage space in the audio reproducing device 20.

After the transfer operation is completed, the audio reproducing device 20 performs so-called shuffle reproduction in which stored audio files are randomly selected and reproduced. In this case, suppose that as an example, four audio files having file names "C0.mp3", "E0.mp3", "F0.mp3", and "B0.mp3" have been reproduced (step S32). When the audio files have been reproduced, information indicating that the files have been reproduced is stored in the audio reproducing device 20.

Next, when the audio reproducing device 20 and the audio server 10 are automatically connected to each other again, the audio reproducing device 20 deletes the reproduced audio files (step S33). A free space is thereby created in the audio file storage space of the audio reproducing device 20. The audio server 10 selects audio files that have not been transferred to the audio reproducing device 20 (four audio files having file names "G0.mp3", "H0.mp3", "I0.mp3", and "J0.mp3" in this case) from the audio files stored on the HDD 14, and then transfers the selected audio files to the audio reproducing device 20 (step S34). These audio files are stored in the audio reproducing device 20, filling the created free space.

By repeating such an operation, the audio reproducing device 20 sequentially replaces audio files that have been reproduced by the audio reproducing device 20 only once or more than once with new audio files that have not been reproduced by the audio reproducing device 20. Thereby, even when the storage capacity of the audio reproducing device 20 is smaller than that of the audio server 10, the audio reproducing device 20 can virtually take out and reproduce all the audio files within the audio server 10. Thus the audio reproducing device 20 reproduces more audio files to be listened to by the user.

That is, in the automatic updating process in the all-piece transfer mode, audio files that have not been reproduced are surely reproduced when the audio reproducing device 20 reproduces the audio files. In addition, the audio reproducing device 20 replaces the reproduced audio files with unreproduced audio files at the time of a next automatic updating process. Thus, at a point in time when all the audio files within the audio server 10 have each been transferred once by repeating the automatic updating process, an amount of unreproduced audio files of all the audio files corresponds to only the storage capacity of the audio reproducing device 20.

On the other hand, for example, in a case where audio files of musical pieces that do not suit preferences of the user (unreproduced audio files, audio files that have been reproduced a relatively small number of times, audio files on which a skip operation is performed during reproduction thereof, and the like) are deleted within the audio reproducing device 20 by an automatic updating process, as the automatic updating process is repeated, the number of reproduced audio files gradually increases within the audio reproducing device 20, and thus it becomes difficult to transfer unreproduced audio files. In addition, because the automatic updating process often replaces unreproduced audio files with other audio files, unreproduced audio files at a point in time that all the audio files within the audio server 10 have each been transferred once by repeating the automatic updating process exceed the storage capacity of the audio reproducing device 20.

Supposing that the audio reproducing device 20 reproduces a same number of audio files before performing a next automatic updating process, a certain number of automatic updating processes are performed in the all-piece transfer mode until the amount of unreproduced audio files reaches the storage capacity of the audio reproducing device 20. However, in the case where the audio files of musical pieces not preferred by the user are deleted, it is not possible to calculate an upper limit of the number of automatic updating processes performed until the amount of unreproduced audio files reaches the storage capacity of the audio reproducing device 20. Thus, according to the automatic updating process in the all-piece transfer mode, the audio reproducing device 20 can surely reproduce all the audio files within the audio server 10 in a shorter period.

In addition, for example, in a case where audio files within the audio reproducing device 20 are simply replaced with untransferred audio files regardless of whether or not the audio files have been reproduced in the audio reproducing device 20, it is similarly not possible to calculate an upper limit of the number of automatic updating processes performed until the amount of unreproduced audio files reaches the storage capacity of the audio reproducing device 20.

Incidentally, the procedure of the automatic updating process in the all-piece transfer mode as described above can be applied not only to cases where the audio reproducing device 20 and the audio server 10 are connected to each other by a wireless LAN and a wired LAN but also to cases where the audio reproducing device 20 and the audio server 10 are connected to each other by other communication standards such for example as USB, IEEE (Institute of Electrical and Electronic Engineers) 1394, and Bluetooth (trademark).

Figure 7:
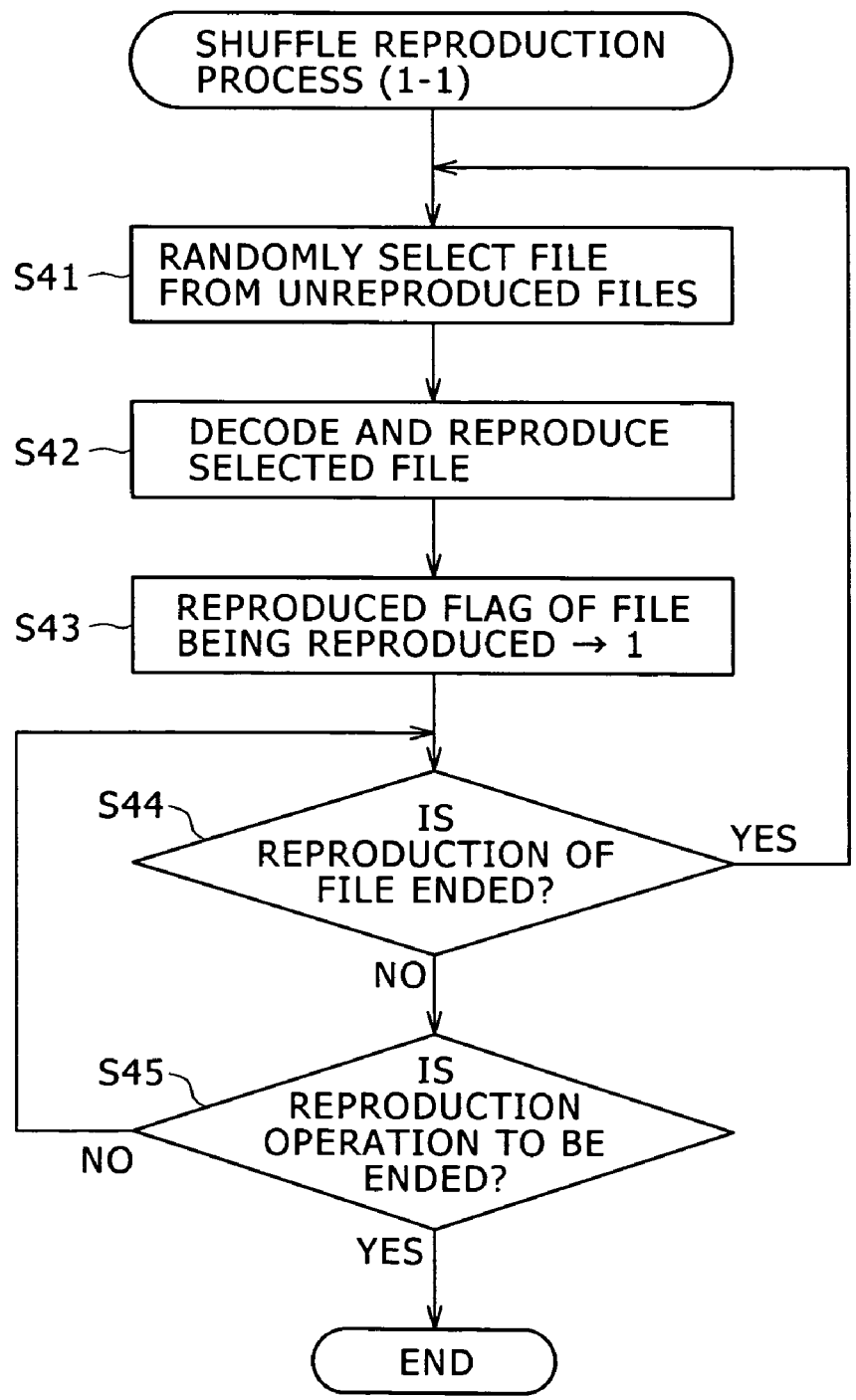
FIG. 7 is a flowchart representing the procedure of a shuffle reproduction process (process example 1-1) in the audio reproducing device.

Next, FIG. 7 is a flowchart representing the procedure of a shuffle reproduction process (process example 1-1) in the audio reproducing device.

As described above, when an audio file is reproduced by the audio reproducing device 20, information indicating that the file has been reproduced is stored within the audio reproducing device 20. Suppose in this case that a reproduced flag associated with each audio file is stored as the information on the nonvolatile recording medium 23. This reproduced flag is "0" in an initial state.

When the shuffle reproduction is started, the microprocessor 22 randomly selects one audio file from unreproduced audio files stored on the nonvolatile recording medium 23, that is, audio files whose reproduced flag is "0" (step S41). Then the microprocessor 22 decodes the selected audio file, and sequentially outputs the decoded audio file to the D/A converting unit 26. Thereby sound is reproduced and output (step S42). Further, the microprocessor 22 changes the reproduced flag corresponding to the audio file the reproduction of which has been started to "1" (step S43).

The microprocessor 22 thereafter determines whether the reproduction of the audio file being reproduced is ended (step S44). In this case, the microprocessor 22 determines that the reproduction is ended when the process of the reproduction to an end of the audio file is completed or when a skip operation requesting the reproduction of a next audio file is performed by the user, for example. When determining that the reproduction is ended, the microprocessor 22 randomly selects an audio file to be reproduced next from the unreproduced audio files (step S41). The microprocessor 22 then performs the reproduction process as in the above.

When the microprocessor 22 determines in step S44 that the reproduction is not ended, on the other hand, the microprocessor 22 further determines whether a request to end the audio reproducing operation itself is made by a user operation (step S45). When the request is made, the reproducing operation is ended. When the request is not made, the determination processes of step S44 and step S45 are thereafter repeated.

With the above process, in the audio reproducing device 20, when an audio file stored on the nonvolatile recording medium 23 is reproduced, the reproduced flag corresponding to the file is changed to "1" so that the reproduced audio file can be identified at a time of the audio file automatic updating process to be described later.

Incidentally, while the above description supposes that the audio reproducing device 20 performs shuffle reproduction, the audio reproducing device 20 is not limited to this, and may reproduce an arbitrary audio file selected by the user even when the audio reproducing device 20 is set in the all-piece transfer mode. Also in this case, as in the above, when an audio file is reproduced, information indicating that the file has been reproduced is stored within the audio reproducing device 20.

However, the shuffle reproduction, especially an all-piece shuffle reproduction function that randomly reproduces all files within a storage area has a major feature of allowing the user to listen to a larger number of audio files irrespective of preferences of the user. It can thus be said to be desirable that when the audio reproducing device 20 is set in the all-piece transfer mode, a shuffle reproduction mode be selected as a reproduction mode at least in an initial state.

When the audio reproducing device 20 is connected to the audio server 10, and the audio server 10 selects audio files other then transferred audio files, it suffices for the audio server 10 to select the audio files in order of accumulation on the HDD 14. Alternatively, the audio server 10 may randomly select an audio file from the audio files other then the transferred audio files within the HDD 14, and then transfer the audio file to the audio reproducing device 20. Suppose that the latter method is adopted as an example in each process example to be described below.

Description will next be made of concrete process examples of the audio server 10 and the audio reproducing device 20 when the all-piece transfer mode as described above is selected.

ALL-PIECE TRANSFER MODE: PROCESS EXAMPLE 2-1

Figure 8:
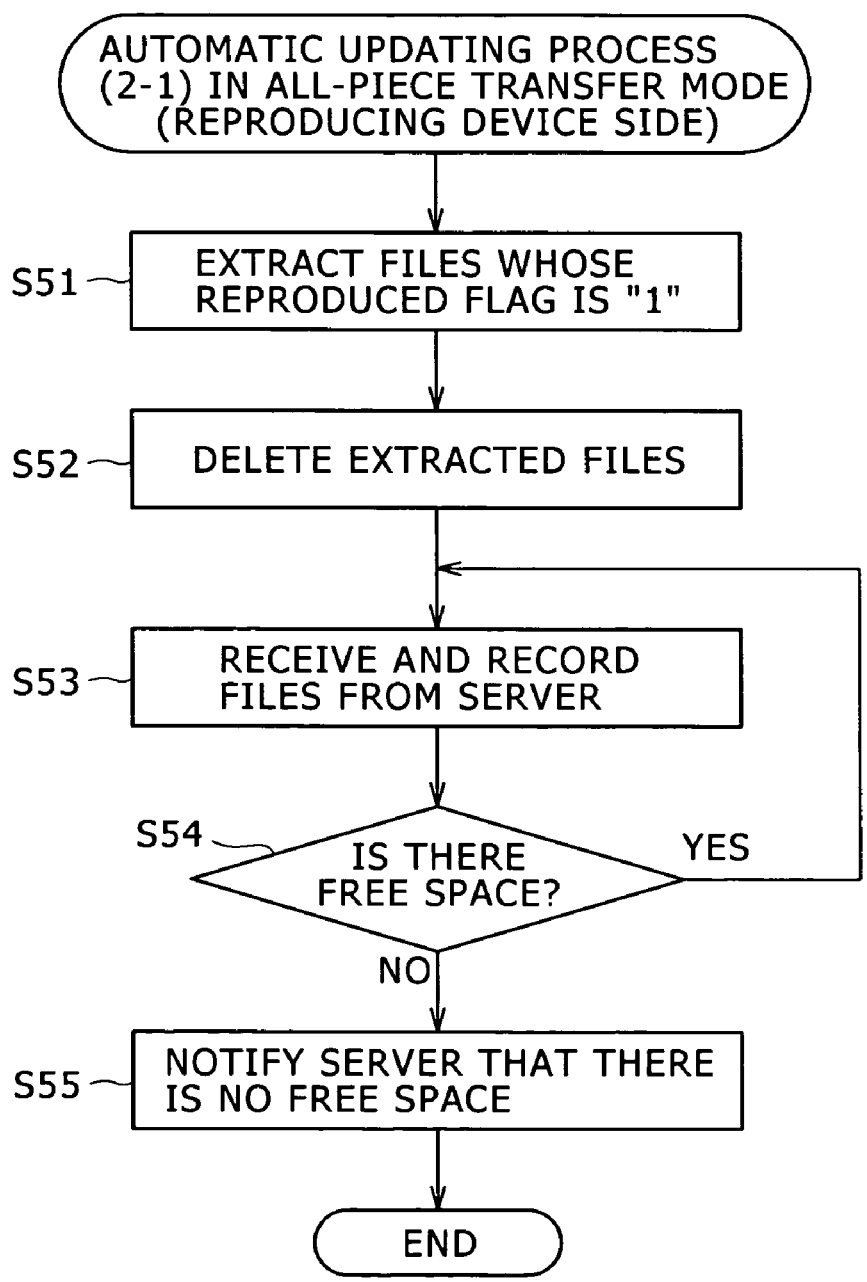
FIG. 8 is a flowchart representing a process procedure on the audio reproducing device side in an audio file automatic updating process (process example 2-1) in the all-piece transfer mode.

FIG. 8 is a flowchart representing a process procedure on the audio reproducing device side in an audio file automatic updating process (process example 2-1) in the all-piece transfer mode.

When the audio reproducing device 20 has been connected to the audio server 10 through the wireless LAN, the microprocessor 22 extracts audio files whose reproduced flag is "1" (step S51). The microprocessor 22 then deletes the extracted audio files from the nonvolatile recording medium 23 to create a free space (step S52).

Next, audio files transferred from the audio server 10 are sequentially received and recorded on the nonvolatile recording medium 23 (step S53). While performing this recording process, the microprocessor 22 monitors to determine whether the nonvolatile recording medium 23 has free space (step S54). While there is free space, the microprocessor 22 continues the audio file receiving and recording process (step S53). When the nonvolatile recording medium 23 ceases to have free space, the microprocessor 22 notifies the audio server 10 through the wireless LAN that there is no free space (step S55). Incidentally, data being recorded onto the nonvolatile recording medium 23 when it is detected that there is no free space is deleted. In addition, the process of notifying the audio server 10 that there is no free space may be performed by returning an audio file reception error, for example.

Figure 9:
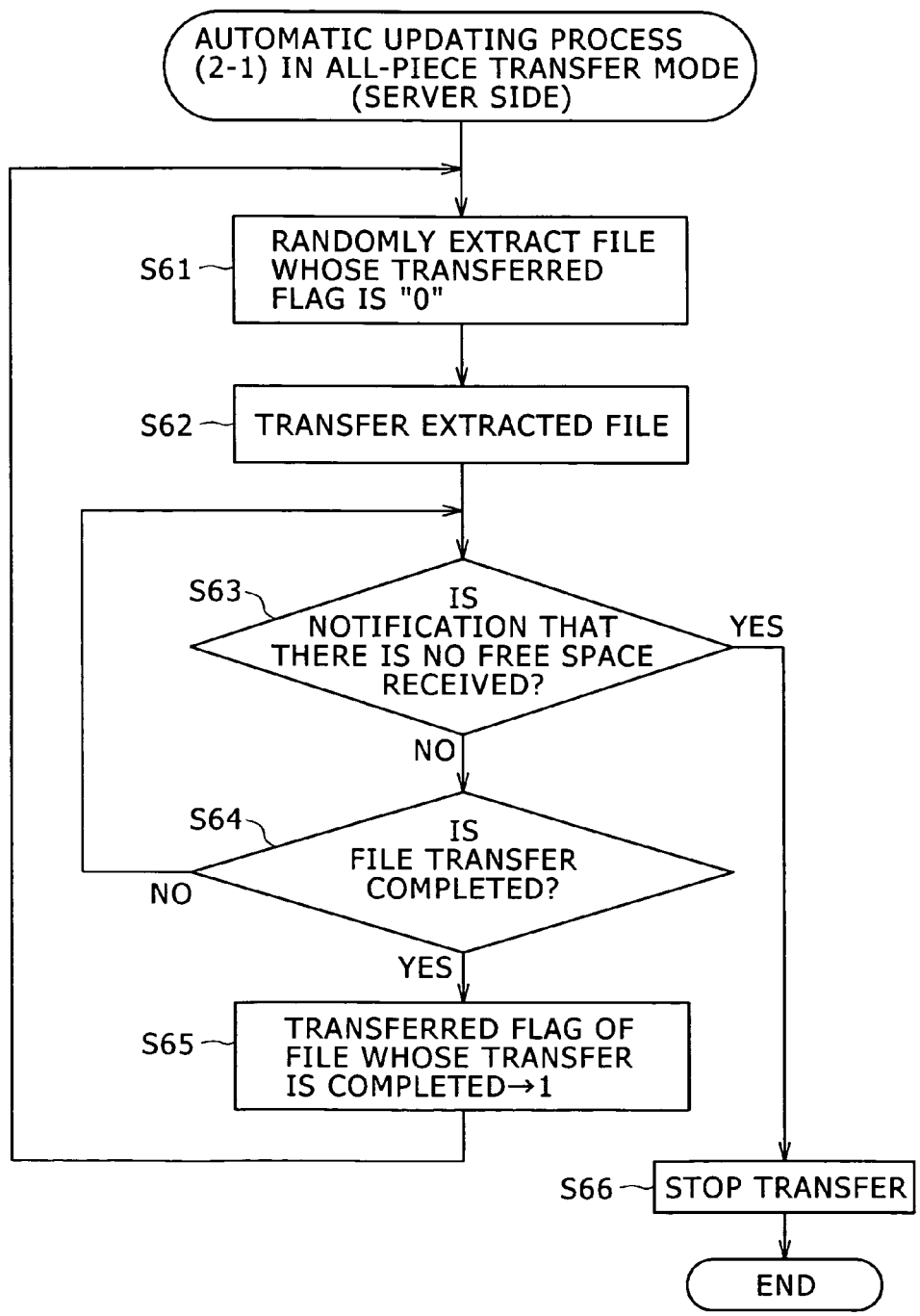
FIG. 9 is a flowchart representing a process procedure on the audio server side in the audio file automatic updating process (process example 2-1) in the all-piece transfer mode.

FIG. 9 is a flowchart representing a process procedure on the audio server side in the audio file automatic updating process (process example 2-1) in the all-piece transfer mode.

In the audio server 10, in association with each of the audio files stored on the HDD 14, a transferred flag indicating whether the audio file has been transferred to the audio reproducing device 20 is stored.

After confirming that the audio server 10 is connected to the audio reproducing device 20, the CPU 11 of the audio server 10 randomly extracts a file not yet transferred to the audio reproducing device 20, that is, a file whose transferred flag is "0" from the audio files stored on the HDD 14 (step S61). The CPU 11 then transfers the extracted audio file to the audio reproducing device 20 (step S62).

While transferring the one audio file, the CPU 11 monitors to determine whether a notification indicating that there is no free space is received from the audio reproducing device 20 (step S63). When the notification is not received, the CPU 11 determines whether the transfer of the one audio file is completed (step S64). When the transfer of the one audio file is not completed, the determination processes of step S63 and step S64 are repeated.

When normally completing the transfer of the audio file without receiving the notification that there is no free space, the CPU 11 changes the transferred flag corresponding to the audio file whose transfer is completed to "1" (step S65). The CPU 11 then performs the process of step S61 again to start a process of transferring a next audio file.

When receiving the notification that there is no free space from the audio reproducing device 20 in step S63, the CPU 11 stops the process of transferring the audio file whose transfer has been started (step S66). In this case, the transferred flag corresponding to the audio file whose transfer is stopped remains "0".

According to the above process example 2-1, the audio server 10 does not at all need to recognize how much free space is in the audio reproducing device 20 to which the audio server 10 is connected, and it suffices for the audio server 10 simply to transfer audio files stored in the audio server 10 sequentially. Therefore the process on the audio server 10 side can be simplified.

ALL-PIECE TRANSFER MODE: PROCESS EXAMPLE 2-2

An automatic updating process example 2-2 represented in FIG. 10 and FIG. 11 to be described in the following is different from the above-described process example 2-1 in that the audio reproducing device 20 notifies the audio server 10 of the space of a free area in advance before an audio file is transferred from the audio server 10 to the audio reproducing device 20.

Figure 10:
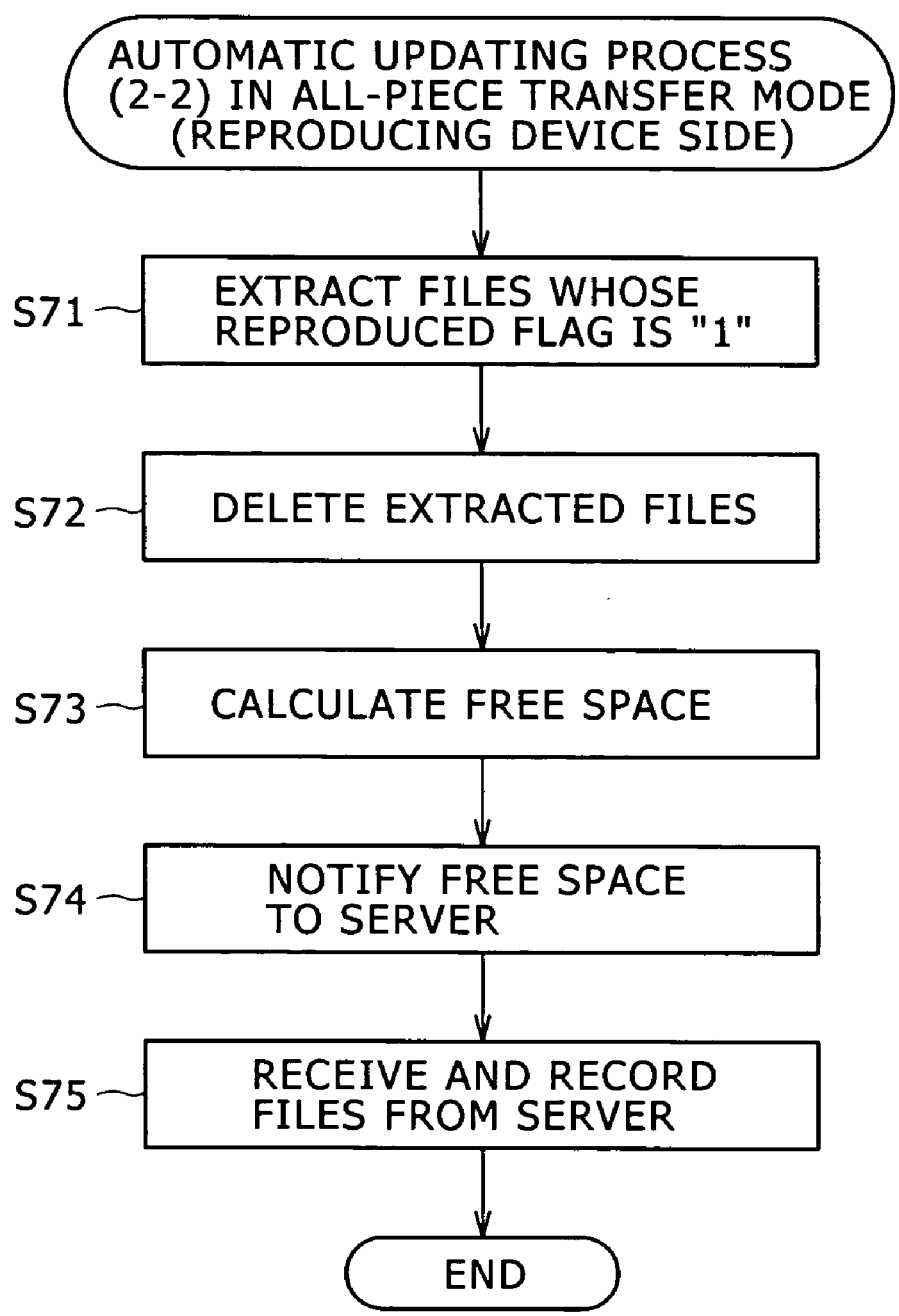
FIG. 10 is a flowchart representing a process procedure on the audio reproducing device side in an audio file automatic updating process (process example 2-2) in the all-piece transfer mode.

FIG. 10 is a flowchart representing a process procedure on the audio reproducing device side in an audio file automatic updating process (process example 2-2) in the all-piece transfer mode.

As in the case of the process example 2-1, when the audio reproducing device 20 has been connected to the audio server 10, the microprocessor 22 extracts audio files whose reproduced flag is "1" (step S71). The microprocessor 22 then deletes the extracted audio files from the nonvolatile recording medium 23 to create a free area (step S72).

The microprocessor 22 next calculates the space of the created free area (free space) (step S73). The microprocessor 22 notifies the calculated free space to the audio server 10 (step S74). When thereafter receiving audio files transferred from the audio server 10, the microprocessor 22 sequentially records the audio files onto the nonvolatile recording medium 23 (step S75). In this recording process, the file transfer from the audio server 10 is stopped automatically when the free space is filled.

Figure 11:
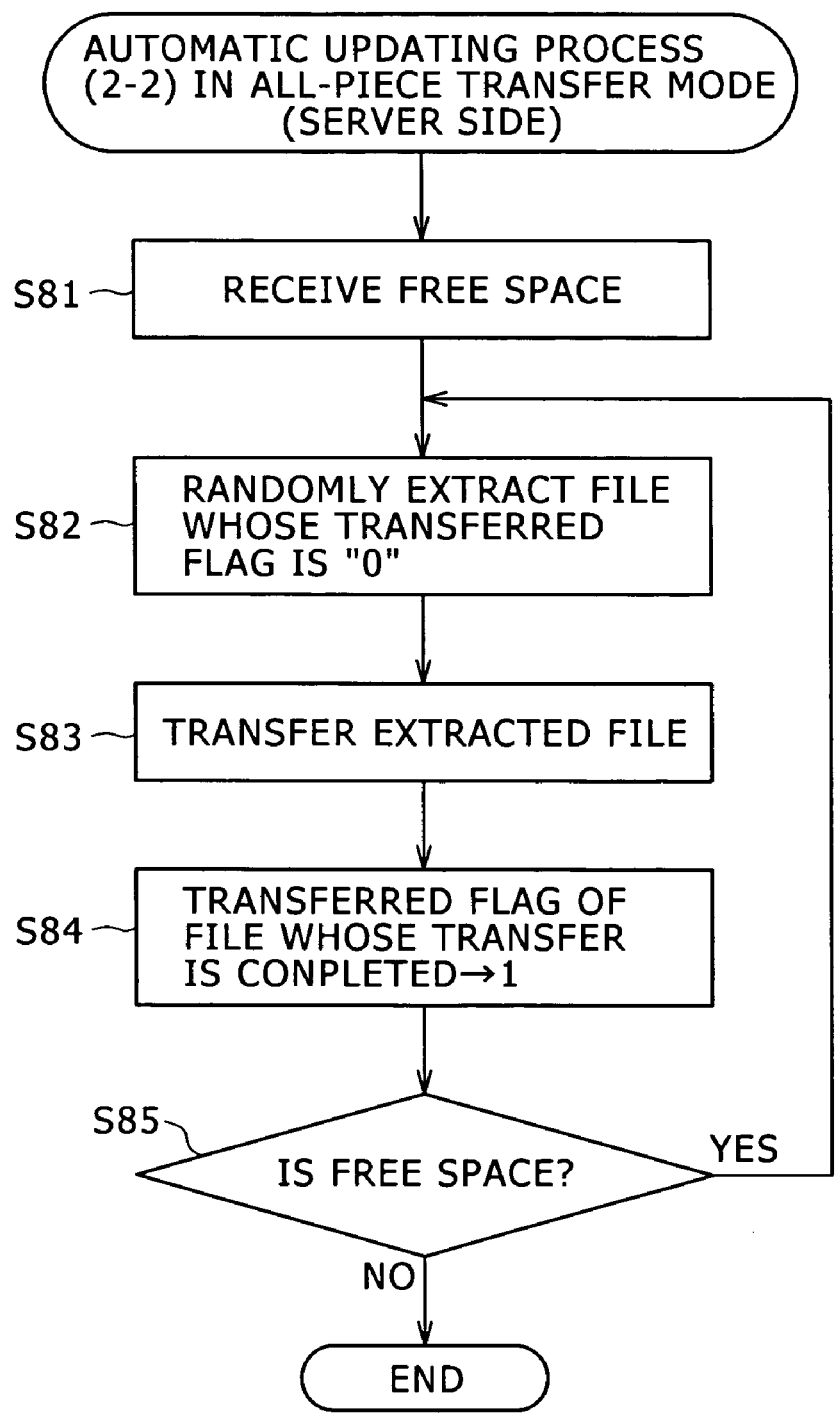
FIG. 11 is a flowchart representing a process procedure on the audio server side in the audio file automatic updating process (process example 2-2) in the all-piece transfer mode.

FIG. 11 is a flowchart representing a process procedure on the audio server side in the audio file automatic updating process (process example 2-2) in the all-piece transfer mode.

After confirming that the audio server 10 is connected to the audio reproducing device 20, the CPU 11 of the audio server 10 receives the free space transmitted from the audio reproducing device 20 (step S81). At this time, the CPU 11 stores the received free space as a "present free space".

Next, the CPU 11 randomly extracts a file whose transferred flag is "0" from the audio files stored on the HDD 14 (step S82). The CPU 11 then transfers the audio file to the audio reproducing device 20 (step S83). Incidentally, in practice, the CPU 11 determines whether the data size of the audio file extracted in step S82 is equal to or smaller than the present free space of the audio reproducing device 20, and transfers the audio file only when the data size of the audio file is equal to or smaller than the present free space. When the data size is larger than the present free space, the CPU 11 randomly selects another file that has not been transferred yet, performs a similar determination process, and thereafter performs the transfer process.

When the transfer of the one audio file is completed, the CPU 11 changes the transferred flag corresponding to the audio file to "1" (step S84). Next, the CPU 11 updates the present free space by subtracting the data size of the audio file transferred in step S83 from the present free space, and determines whether the present free space after the update is equal to or smaller than the free space received in step S81, that is, whether there is free space in the audio reproducing device 20 at this stage (step S85). When there is no free space, the transfer process is ended at this point in time. When there is free space, on the other hand, the file extracting process in step S82 is performed to start the process of transferring another audio file.

Incidentally, in the above process example 2-2, the audio server 10 recognizes a transferable amount of data by receiving the free space from the audio reproducing device 20 before transferring an audio file. However, as another example, the audio server 10 may receive identifying information identifying reproduced audio files (that is, deleted audio files) from the audio reproducing device 20 before transferring an audio file. In this case, because the audio server 10 stores audio files that have been transferred to the audio reproducing device 20, the audio server 10 can calculate a new free space created in the audio reproducing device 20 on the basis of the data size of the audio files corresponding to the received identifying information. Then, on the basis of the calculated free space, the audio server 10 can perform the same process as in step S82 and subsequent steps in FIG. 11 described above.

In the above-described process examples 2-1 and 2-2, transferred flags are stored in the audio server 10 so that audio files that have not been transferred yet are surely transferred to the audio reproducing device 20. However, even in a case where an audio file is randomly extracted from all the audio files stored on the HDD 14 without a transferred flag being used, and then the audio file is transferred, an effect of being able to reproduce as many audio files as possible in the audio reproducing device 20 occurs, though great effects as in the process examples 1 and 2 are not produced.

SHUFFLE REPRODUCTION: PROCESS EXAMPLE 1-2

Figure 12:
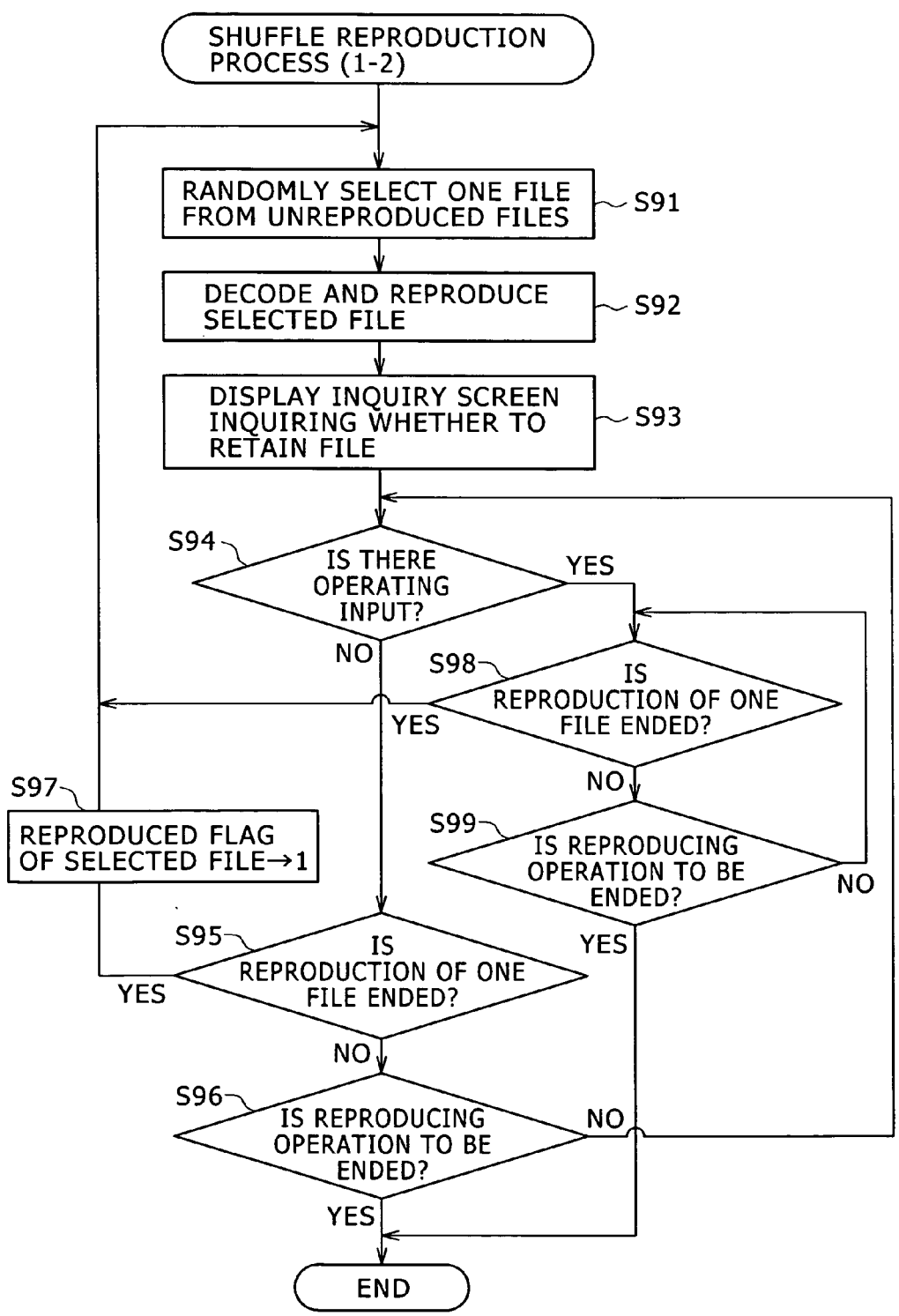
FIG. 12 is a flowchart representing the procedure of a shuffle reproduction process (process example 1-2)

FIG. 12 is a flowchart representing the procedure of a shuffle reproduction process (process example 1-2).

In this process example 1-2, as in the above-described process, the audio reproducing device 20 can reproduce as many audio files as possible within the audio server 10, and audio files that the user does not desire to be deleted among reproduced audio files can be retained in the audio reproducing device 20.

First, when a shuffle reproduction is started, as in steps S41 and S42 in FIG. 7, the microprocessor 22 randomly selects one audio file from the audio files stored on the nonvolatile recording medium 23 and whose reproduced flag is "0" (step S91). The microprocessor 22 decodes and reproduces the selected audio file (step S92).

When the reproduction of the audio file is started, the microprocessor 22 makes the display unit 24 display an inquiry screen inquiring of the user whether to retain the audio file being reproduced in the audio reproducing device 20 (step S93). The microprocessor 22 then monitors to determine whether an operating input by the user for requesting the retention of the audio file is supplied through a predetermined operating key or the like of the input unit 25 in response to the display (step S94).

The monitoring for an operating input in step S94 is continued until the reproduction of the one audio file is ended in step S95 or until audio reproducing operation itself is ended in step S96. Incidentally, determination processes performed in steps S94 and S95 are the same as in steps S44 and S45, respectively, in FIG. 7.

When the reproduction of the audio file is ended in step S95 without any operating input by the user being detected, the microprocessor 22 changes the reproduced flag corresponding to the reproduced audio file to "1" (step S97). Thereafter, the microprocessor 22 randomly selects an audio file to be reproduced next from the unreproduced audio files (step S91), and then performs a reproducing process as described above. When a request is made to end the reproducing operation itself in step S96, the reproducing operation is ended.

When the microprocessor 22 determines in step S94 that an operating input is supplied by the user, on the other hand, the microprocessor 22 ends the display of the inquiry screen, and further repeats a determination process (step S98) for determining whether the reproduction of the audio file is ended, which determination process is the same as in step S95, and a determination process (step S99) for determining whether the reproducing operation itself is ended, which determination process is the same as in step S96. When a request to end the reproducing operation itself is made in step S99, the reproducing operation is ended.

When the reproduction of the audio file is ended in step S98, the microprocessor 22 performs the process of step S91 again without changing the reproduced flag corresponding to the audio file, and then starts a process of reproducing a next unreproduced audio file.

In the above-described process example 1-2, in a case where the user performs a predetermined operating input in response to an inquiry screen during the reproduction of an audio file, the audio file is not deleted from the audio reproducing device 20 when the automatic updating process is performed between the audio server 10 and the audio reproducing device 20 after reproducing operation is ended. Thus, for example, an audio file of a musical piece that the user listens to and takes a liking for can be retained in the audio reproducing device 20 to be reproduced again.

[Desired Piece Transfer Mode]

It is convenient to be able to automatically download only data of musical pieces belonging to a genre specified by the user or having a music tune specified by the user to the audio reproducing device 20 when the audio reproducing device 20 is automatically connected to the audio server 10.

In order to realize such a function, characteristic information such as a genre of musical pieces desired to be listened to, a music tune (a gloomy tune, a cheerful tune, a fast-tempo tune or the like), an effect brought about by a musical piece (healing music, music that makes a person feel high, or the like) is set in advance in the audio reproducing device 20 by a user operation. Meanwhile, characteristic information as described above is added to audio files stored in the audio server 10. The characteristic information may be characteristic information added to the audio files in advance. Alternatively, the audio data may be analyzed at a time of storing the audio data, and the characteristic information may be added to the audio files on the basis of a result of the analysis.

When the audio reproducing device 20 thereafter automatically connects to the audio server 10, the set characteristic information as described above is notified to the audio server 10. Thereby, the audio server 10 can extract audio files matching contents of the notified characteristic information and then transfer the audio files to the audio reproducing device 20.

Further, such a function can be applied to the above-described operation in the all-piece transfer mode so that the audio reproducing device 20 can reproduce only audio files corresponding to musical pieces belonging to a genre specified by the user or having a tune specified by the user as much as possible among the audio files stored in the audio server 10. A transfer mode at the time of such an automatic updating process will hereinafter be referred to as a "desired piece transfer mode".

FIG. 13 is a flowchart representing a process procedure on the audio server side in an audio file automatic updating process in the desired piece transfer mode.

After confirming that the audio server 10 is connected to the audio reproducing device 20, the audio server 10 receives characteristic information on a genre of musical pieces desired to be listened to from the audio reproducing device 20 (step S101). Referring to the added information added to the audio files stored on the HDD 14, the CPU 11 of the audio server 10 extracts audio files matching the contents of the received characteristic information from the audio files stored on the HDD 14 (step S102). Next, the CPU 11 further extracts a file whose transferred flag is "0" from the extracted audio files (step S103). The CPU 11 then transfers the extracted audio file to the audio reproducing device 20 (step S104).

Subsequent steps S105 to S108 correspond to steps S63 to S66, respectively, in FIG. 9. Specifically, when a notification that there is no free space is received from the audio reproducing device 20 during the transfer of the audio file, the transfer of the audio file is stopped. When the transfer of the file is completed without the notification being received, the transferred flag corresponding to the audio file is changed to "1", and thereafter the process of step S103 is performed.

Incidentally, when the audio reproducing device 20 has been connected to the audio server 10, it suffices for the audio reproducing device 20 first to transfer, to the audio server 10, characteristic information for musical pieces desired to be listened to, which information is set at the point in time when the audio reproducing device 20 is connected to the audio server 10, and then to perform the process of step S51 and the subsequent steps shown in FIG. 8.

In addition, in the above-described process example, following the above-described process example 2-1, when free space is exhausted, the audio reproducing device 20 receiving a transferred audio file notifies the audio server 10 that there is no free space. However, as in the process example 2-2, the audio server 10 may receive a notification of free space from the audio reproducing device 20 before transferring an audio file, and then transfer audio files whose amount corresponds to the free space.

[Favorite Collecting Mode]

In the following, description will be made of a process when the audio reproducing device 20 deletes only audio files that the user listens to and does not find it particularly necessary to retain within the device. By such a process, audio files of musical pieces to the liking of the user are gradually accumulated in the audio reproducing device 20. Such an operation mode will hereinafter be referred to as a "favorite collecting mode".

FIG. 14 is a flowchart representing a process procedure for reproducing an audio file in the favorite collecting mode.

In place of the above-described reproduced flag, a deleted flag indicating whether to delete an audio file at a time of the automatic updating process is stored in the audio reproducing device 20 in association with each audio file. This deleted flag is "0" in an initial state.

The microprocessor 22 of the audio reproducing device 20 decodes and reproduces a predetermined audio file among the audio files stored on the nonvolatile recording medium 23 (step S111). In step S111, the audio file may be randomly selected from the stored audio files and then reproduced, or an audio file selected by a user operation may be reproduced.

After starting the reproduction of the audio file, the microprocessor 22 monitors to determine whether an operating input is performed by the user to request the deletion of the audio file being reproduced at a time of the automatic updating process through a predetermined operating key of the input unit 25 or the like (step S112). The monitoring for an operating input in step S112 is continued until the reproduction of the one audio file is ended in step S113 or until audio reproducing operation itself is ended in step S114. Incidentally, determination processes performed in steps S113 and S114 are the same as in steps S44 and S45, respectively, in FIG. 7.

When the reproduction of the audio file is ended in step S113 without any operating input by the user being detected, the microprocessor 22 selects an audio file to be reproduced next, and then performs a reproducing process as described above (step S111). When a request is made to end the reproducing operation itself in step S114, the reproducing operation is ended.

When the microprocessor 22 determines in step S112 that an operating input is supplied by the user, on the other hand, the microprocessor 22 further repeats a determination process (step S115) for determining whether the reproduction of the audio file is ended, which determination process is the same as in step S113, and a determination process (step S116) for determining whether the reproducing operation itself is ended, which determination process is the same as in step S114. When a request to end the reproducing operation itself is made in step S116, the reproducing operation is ended.

When the reproduction of the audio file is ended in step S115, the microprocessor 22 changes the deleted flag corresponding to the audio file that has been reproduced to "1" (step S117). Thereafter, the microprocessor 22 selects a next audio file to be reproduced, and starts a reproducing process as described above (step S111).

In the above-described reproducing process, only the deleted flag corresponding to the audio file for which an operating input is performed by the user during the reproduction of the audio file is set to "1". Then, when the audio reproducing device 20 is thereafter automatically connected to the audio server 10, and the automatic updating process is performed, the process in the process example 2-1 (FIG. 8 and FIG. 9) or the process example 2-2 (FIG. 10 and FIG. 11) is performed referring to the deleted flag in place of the reproduced flag.

Thereby, the audio reproducing device 20 deletes only audio files explicitly requested to be deleted by the user through an operating input at a time of the automatic updating process. Therefore audio files of favorite musical pieces are retained more actively than in the above-described process example 1-2 so that the user can listen to these musical pieces again. Thus, the above-described reproducing process is suitable to a case where the user desires to collect the audio files of favorite musical pieces in the audio reproducing device 20. On the other hand, audio files requested to be deleted are replaced with new unreproduced files transferred from the audio server 10, so that the user can listen to new musical pieces that the user has not listened to.

It is to be noted that while audio data is illustrated as content data reproduced in a reproducing device in the above-described embodiment, the present invention is not limited to this, and moving image data and still image data, for example, can be applied. Hence, a portable type device capable of reproducing these pieces of content data can be applied as a reproducing device, and a device such as a PC or the like capable of storing and transferring these pieces of content data can be applied as a server.

The processing functions of the reproducing device and the server as described above can each be implemented by a computer. In this case, a program describing the processing functions is provided. Then, the program is executed by a computer, whereby the processing functions are implemented on the computer. The program describing the processing contents can be recorded on a computer readable recording medium. The computer readable recording medium includes magnetic recording devices, optical disks, magneto-optical disks, semiconductor memories and the like.

When distributing the program, a portable recording medium having the program recorded thereon, such as an optical disk or a semiconductor memory, for example, is sold. In addition, it is possible to store the program in a storage device of a server computer, and transfer the program from the server computer to another computer via a network.

The computer for executing the program for example stores the program recorded on the portable recording medium or the program transferred from the server computer in a storage device of the computer. Then, the computer reads the program from the storage device of the computer, and performs a process according to the program. Incidentally, the computer can also read the program directly from the portable recording medium and perform a process according to the program. In addition, the computer can sequentially perform a process according to the program being received each time the program is transferred from the server computer.

It should be understood by those skilled in the art that various modifications, combinations, sub-combinations and alterations may occur depending on design requirements and other factors insofar as they are within the scope of the appended claims or the equivalents thereof.

What is claimed is:

1. A portable type content reproducing device for reproducing content data, said portable type content reproducing device comprising:
   a radio communication unit configured to connect to a network by radio and perform communication;
   a nonvolatile storage unit configured to store content data received from a specific content server on a network through said radio communication unit;
   a reproduction processing unit configured to reproduce the content data read from said nonvolatile storage unit;
   a connection controlling unit configured to count time and make said radio communication unit perform an operation of connecting to the network by radio when a timer set time has passed; and
   a reception controlling unit configured to control an operation of receiving the content data through said radio communication unit;
   wherein when said specific content server is present on the network to which said content reproducing device is connected by radio by said radio communication unit, said reception controlling unit receives the content data from said specific content server through said radio communication unit and stores the content data in free space of said nonvolatile storage unit, and then sets said timer set time to a predetermined time and makes said connection controlling unit start counting time, and
   when a radio signal for connecting to the network is detected by said radio communication unit, but said specific content server is not present on the connected network, said reception controlling unit extends said timer set time and makes said connection controlling unit start counting time.

2. The content reproducing device according to claim 1, wherein when said radio signal is not detected by said radio communication unit, said reception controlling unit shortens said timer set time with a predetermined minimum time as a limit, and makes said connection controlling unit start counting time.

3. The content reproducing device according to claim 2, wherein when said radio signal is not detected by said radio communication unit, said reception controlling unit shortens said timer set time in stages with said minimum time as a limit.

4. The content reproducing device according to claim 2, wherein when said specific content server is present on the network to which said content reproducing device is connected by radio by said radio communication unit, said reception controlling unit receives the content data from said specific content server and stores the content data in said nonvolatile storage unit, and then sets said timer set time to said minimum time.

5. The content reproducing device according to claim 2, further comprising a chargeable battery for driving said content reproducing device, wherein when said specific content server is present on the network to which said content reproducing device is connected by radio by said radio communication unit, said reception controlling unit receives the content data from said specific content server and stores the content data in said nonvolatile storage unit, and then sets said timer set time to said minimum time when said battery is being charged and sets said timer set time to a predetermined time longer than said minimum time when said battery is not being charged.

6. The content reproducing device according to claim 2, wherein when a radio signal for connecting to the network is detected by said radio communication unit, but said specific content server is not present on the connected network, said reception controlling unit sets said timer set time to a predetermined maximum time.

7. The content reproducing device according to claim 2, wherein said connection controlling unit stops supply of power to said radio communication unit for a period from a start of the counting of time to a time when said timer set time has passed.

8. The content reproducing device according to claim 2, wherein in a case where said content reproducing device is driven by a battery and an amount of charge remaining in said battery is equal to or smaller than a predetermined amount when said timer set time has passed after counting time, said connection controlling unit does not make said radio communication unit perform the operation of connecting to the network by radio.

9. The content reproducing device according to claim 2, further comprising a reproduction identification processing unit configured to, when the content data is reproduced by said reproduction processing unit, update reproduction identifying information corresponding to the reproduced content data such that said reproduction identifying information indicates that the content data has been reproduced,
wherein when said specific content server is present on the network to which said content reproducing device is connected by radio by said radio communication unit, said reception controlling unit deletes the content data whose corresponding said reproduction identifying information indicates that the content data has been reproduced from said nonvolatile storage unit, then receives new content data from said specific content server through said radio communication unit, and stores the new content data in free space of said nonvolatile storage unit.

10. The content reproducing device according to claim 9, wherein said reception controlling unit sequentially receives first content data from said specific content server through said radio communication unit and stores the first content data in the free space of said nonvolatile storage unit, and when the free space is exhausted, said reception controlling unit notifies said specific content server that there is no free space, and ends a content data receiving and storing process.

11. The content reproducing device according to claim 9, wherein after deleting the content data whose corresponding said reproduction identifying information indicates that the content data has been reproduced from said nonvolatile storage unit, said reception controlling unit notifies a present free space of said nonvolatile storage unit to said specific content server, receives new content data whose amount is within the present free space, and stores the new content data in the free space of said nonvolatile storage unit.

12. The content reproducing device according to claim 9, wherein after deleting the content data whose corresponding said reproduction identifying information indicates that the content data has been reproduced from said nonvolatile storage unit, said reception controlling unit notifies content identifying information for identifying the deleted content data to said specific content server, receives new content data whose amount corresponds to a total data volume of the deleted content data, and stores the new content data in the free space of said nonvolatile storage unit.

13. The content reproducing device according to claim 9, wherein after deleting the content data whose corresponding said reproduction identifying information indicates that the content data has been reproduced from said nonvolatile storage unit, said reception controlling unit notifies characteristic information indicating a characteristic of contents reproduced by a user to said specific content server, receives new content data matching a content of said characteristic information, and stores the new content data in the free space of said nonvolatile storage unit.

14. The content reproducing device according to claim 9, wherein when the content data is reproduced by said reproduction processing unit, said reproduction identification processing unit inquires of a user by display information whether to retain the content data in said nonvolatile storage unit, and only when an operating input from the user in response to said display information is not detected before an end of reproduction of the content data, said reproduction identification processing unit updates said reproduction identifying information such that said reproduction identifying information indicates that the content data has been reproduced.

15. The content reproducing device according to claim 9, wherein when the content data is reproduced by said reproduction processing unit, said reproduction identification processing unit inquires of a user by display information whether to set the content data as data to be deleted, and only when an operating input from the user in response to said display information is detected before an end of reproduction of the content data, said reproduction identification processing unit updates said reproduction identifying information such that said reproduction identifying information indicates that the content data has been reproduced.

16. The content reproducing device according to claim 9, wherein when a reproducing process is performed by said reproduction processing unit after the content data whose corresponding said reproduction identifying information indicates that the content data has been reproduced is deleted from said nonvolatile storage unit and then new content data received from said specific content server is stored in said nonvolatile storage unit under control of said reception controlling unit when said content reproducing device is connected to said specific content server, first content data within said nonvolatile storage unit is selected randomly and reproduced.

17. The content reproducing device according to claim 9, wherein when first content data within said nonvolatile storage unit is selected randomly and reproduced by said reproduction processing unit, said reproduction identification processing unit updates reproduction identifying information corresponding to the first content data such that said reproduction identifying information indicates that the first content data has been reproduced.

18. The content reproducing device according to claim 9, wherein in a case where a number of pieces of content data whose reproduction identifying information indicates that the content data has been reproduced among pieces of content data that are stored in said nonvolatile storage unit is lower than a predetermined ratio to all the pieces of content data when said timer set time has passed after counting time, said connection controlling unit does not make said radio communication unit perform the operation of connecting to a network by radio.

19. A portable type content reproducing device for reproducing content data, said portable type content reproducing device comprising:
a communication unit configured to communicate with a content server;
a nonvolatile storage unit configured to store content data received from said content server through said communication unit;
a reproduction processing unit configured to reproduce content the data read from said nonvolatile storage unit;
a reproduction identification processing unit configured to, when the content data is reproduced by said reproduction processing unit, update reproduction identifying information corresponding to the reproduced content data such that said reproduction identifying information indicates that the content data has been reproduced; and
a reception controlling unit configured to delete the content data whose corresponding said reproduction identifying information indicates that the content data has been reproduced from said nonvolatile storage unit after detecting that said content reproducing device is connected to said content server through said communication unit, then receive new content data from said content server through said communication unit, and storing the new content data in free space of said nonvolatile storage unit.

20. A content reproducing system for allowing content data transmitted from a content server to be recorded and reproduced in a portable type content reproducing device,
wherein said portable type content reproducing device comprises,
a first communication unit configured to communicate with said content server,
a first nonvolatile storage unit configured to store first content data received from said content server through said first communication unit,
a reproduction processing unit configured to reproduce the first content data read from said first nonvolatile storage unit,
a reproduction identification processing unit configured to, when the first content data is reproduced by said reproduction processing unit, update reproduction identifying information corresponding to the first content data such that the reproduction identifying information indicates that the first content data has been reproduced, and
a reception controlling unit configured to delete the first content data whose corresponding said reproduction identifying information indicates that the first content data has been reproduced from said first nonvolatile storage unit after detecting that said content reproducing device is connected to said content server through said first communication unit, then receive new content data from said content server through said first communication unit, and store the new content data in free space of said first nonvolatile storage unit, and said content server includes
a second communication unit configured to communicate with said portable type content reproducing device,
a second nonvolatile storage unit configured to store second content data,
a content managing unit configured to manage as to whether each piece of second content data stored in said second nonvolatile storage unit has been transmitted to said portable type content reproducing device, and
a transmission controlling unit configured to, referring to said content managing unit, extract untransmitted content data from the second content data stored in said second nonvolatile storage unit, and transmit the untransmitted content data to said portable type content reproducing device after detecting that said content server is connected to said portable type content reproducing device through said second communication unit.

21. The content reproducing system according to claim 20, wherein after detecting that said content server is connected to said portable type reproducing device through said second communication unit, said transmission controlling unit of said content server selects selected content data from untransmitted content data stored in said second nonvolatile storage unit, and transmits the selected content data to said portable type content reproducing device.

22. The content reproducing system according to claim 20, wherein said reception controlling unit of said portable type content reproducing device sequentially receives the first content data from said content server through said first communication unit and stores the first content data in free space of said first nonvolatile storage unit, and when the free space is exhausted, said reception controlling unit notifies said content server that there is no free space, and ends a content data receiving and storing process, and
said transmission controlling unit of said content server sequentially extracts the untransmitted content data from said second nonvolatile storage unit and transmits the untransmitted content data to said portable type content reproducing device until said content server is notified from said portable type content reproducing device that there is no free space.

23. The content reproducing system according to claim 20, wherein after deleting the first content data whose corresponding said reproduction identifying information indicates that the first content data has been reproduced from said first nonvolatile storage unit, said reception controlling unit of said portable type content reproducing device notifies a present free space of said first nonvolatile storage unit to said content server, and stores new content data received from said content server after notification in the free space of said first nonvolatile storage unit, and
after detecting that said content server is connected to said portable type content reproducing device through said second communication unit, said transmission controlling unit of said content server receives the free space from said content reproducing device, extracts the new content data whose amount is within the received free space from the untransmitted content data stored in said second nonvolatile storage unit, and transmits the new content data to said content reproducing device.

24. The content reproducing system according to claim 20, wherein after deleting the first content data whose corresponding said reproduction identifying information indicates that the first content data has been reproduced from said first nonvolatile storage unit, said reception controlling unit of said portable type content reproducing device notifies content identifying information for identifying the deleted content data to said content server, and stores new content data received from said content server after notification in free space of said first nonvolatile storage unit, and after detecting that said content server is connected to said portable type content reproducing device through said second communication unit, said transmission controlling unit of said content server receives said content identifying information from said portable type content reproducing device, calculates free space newly created in said first nonvolatile storage unit on a basis of a data amount of the first content data corresponding to said content identifying information within said second nonvolatile storage unit, extracts the new content data whose amount is within the calculated free space from the untransmitted content data stored in said second nonvolatile storage unit, and transmits the new content data to said portable type content reproducing device.

25. The content reproducing system according to claim 20, wherein after deleting the first content data whose corresponding said reproduction identifying information indicates that the content data has been reproduced from said first nonvolatile storage unit, said reception controlling unit of said content reproducing device notifies characteristic information indicating a characteristic of contents reproduced by a user to said content server, and stores new content data received from said content server after notification in free space of said first nonvolatile storage unit, and after detecting that said content server is connected to said portable type content reproducing device through said second communication unit, said transmission controlling unit of said content server receives said characteristic information from said content reproducing device, extracts the new content data matching a content of the received said characteristic information from untransmitted content data stored in said second nonvolatile storage unit on a basis of added information added to the untransmitted content data, and transmits the new content data to said portable type content reproducing device.

26. An automatic content receiving method of a portable type content reproducing device, said portable type content reproducing device storing and reproducing content data received from a content server by radio communication, said automatic content receiving method comprising:

a connecting act of a connection controlling unit counting time and making a radio communication unit perform an operation of connecting to a network by radio when a timer set time has passed; and a reception controlling act of a reception controlling unit controlling a receiving operation of receiving the content data from a specific content server on said network through said radio communication unit and storing the content data in a nonvolatile storage unit;

wherein in said reception controlling act, when said specific content server is present on the network to which said content reproducing device is connected by radio by said radio communication unit in said connecting act, the content data is received from said specific content server through said radio communication unit and stored in free space of said nonvolatile storage unit, and then said timer set time is set to a predetermined time and said connecting act is started again, and when a radio signal for connecting to the network is detected by said radio communication unit in said connecting act, but said specific content server is not present on the connected network, said timer set time is extended and said connecting act is started again.

27. An automatic content receiving method of a portable type content reproducing device, said portable type content reproducing device storing and reproducing content data received from a content server, said automatic content receiving method comprising:

an act of, when the content data read from a nonvolatile storage unit is reproduced, a reproduction identification processing unit updating reproduction identifying information corresponding to the reproduced content data such that said reproduction identifying information indicates that the content data has been reproduced; and an act of, after detecting that said content reproducing device is connected to said content server through a communication interface, a reception controlling unit deleting the content data whose corresponding said reproduction identifying information indicates that the content data has been reproduced from said nonvolatile storage unit, then receiving new content data from said content server through said communication interface, and storing the new content data in free space of said nonvolatile storage unit.

28. An automatic content transferring method of a content reproducing system, said content reproducing system allowing content data transmitted from a content server to be recorded and reproduced in a portable type content reproducing device, said automatic content transferring method comprising:

an act of, when said content reproducing device reproduces the content data stored in a first nonvolatile storage unit of said content reproducing device, said content reproducing device updating reproduction identifying information corresponding to the content data such that the reproduction identifying information indicates that the content data has been reproduced;

an act of said content server managing by transmission managing information as to whether each piece of content data stored in a second nonvolatile storage unit of said content server has been transmitted to said portable type content reproducing device;

an act of said content reproducing device deleting the content data whose corresponding said reproduction identifying information indicates that the content data has been reproduced from said first nonvolatile storage unit after detecting that said portable type content reproducing device is connected to said content server;

an act of, referring to said transmission managing information, said content server extracting untransmitted content data from the content data stored in said second nonvolatile storage unit, and transmitting the untransmitted content data to said portable type content reproducing device after detecting that said content server is connected to said portable type content reproducing device; and an act of said content reproducing device storing the content data received from said content server in free space of said first nonvolatile storage unit.

29. A portable type content reproducing device for reproducing content data, said portable type content reproducing device comprising:

radio communication means for connecting to a network by radio and performing communication;

nonvolatile storage means for storing the content data received from a specific content server on a network through said radio communication means;

reproduction processing means for reproducing the content data read from said nonvolatile storage means;

connection controlling means for counting time, and making said radio communication means perform an operation of connecting to a network by radio when a timer set time has passed; and reception controlling means for controlling an operation of receiving the content data through said radio communication means;

wherein when said specific content server is present on the network to which said content reproducing device is connected by radio by said radio communication means, said reception controlling means receives the content data from said specific content server through said radio communication means and stores the content data in free space of said nonvolatile storage means, and then sets said timer set time to a predetermined time and makes said connection controlling means start counting time, and when a radio signal for connecting to the network is detected by said radio communication means, but said specific content server is not present on the connected network, said reception controlling means extends said timer set time and makes said connection controlling means start counting time.

30. A portable type content reproducing device for reproducing content data, said portable type content reproducing device comprising:

communication means for communicating with a content server;

nonvolatile storage means for storing the content data received from said content server through said communication means;

reproduction processing means for reproducing the content data read from said nonvolatile storage means;

reproduction identification processing means for, when the content data is reproduced by said reproduction processing means, updating reproduction identifying information corresponding to the content data such that said reproduction identifying information indicates that the content data has been reproduced; and reception controlling means for deleting the content data whose corresponding said reproduction identifying information indicates that the content data has been reproduced from said nonvolatile storage means after detecting that said content reproducing device is connected to said content server through said communication means, then receiving new content data from said content server through said communication means, and storing the new content data in free space of said nonvolatile storage means.

* * * * *